United States Patent
Ouchi et al.

(10) Patent No.: US 9,699,738 B2
(45) Date of Patent: Jul. 4, 2017

(54) WIRELESS COMMUNICATION SYSTEM, BASE STATION APPARATUS, MOBILE STATION APPARATUS, CONTROL METHOD OF WIRELESS COMMUNICATION SYSTEM, CONTROL PROGRAM OF BASE STATION APPARATUS, AND CONTROL PROGRAM OF MOBILE STATION APPARATUS

(75) Inventors: Wataru Ouchi, Osaka (JP); Shoichi Suzuki, Osaka (JP); Yosuke Akimoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 489 days.

(21) Appl. No.: 13/504,897

(22) PCT Filed: Oct. 4, 2010

(86) PCT No.: PCT/JP2010/067387
§ 371 (c)(1),
(2), (4) Date: Jul. 20, 2012

(87) PCT Pub. No.: WO2011/052347
PCT Pub. Date: May 5, 2011

(65) Prior Publication Data
US 2012/0281650 A1    Nov. 8, 2012

(30) Foreign Application Priority Data
Oct. 28, 2009 (JP) .................. 2009-247899

(51) Int. Cl.
*H04W 52/04* (2009.01)
*H04W 72/04* (2009.01)
(Continued)

(52) U.S. Cl.
CPC ............. *H04W 52/04* (2013.01); *H04L 5/001* (2013.01); *H04L 5/0051* (2013.01);
(Continued)

(58) Field of Classification Search
CPC ...... H04W 52/30; H04W 52/34; H04W 52/04
See application file for complete search history.

(56) References Cited

U.S. PATENT DOCUMENTS 7,965,657 B2 * 6/2011 Muharemovic et al. ..... 370/256
8,000,273 B2 * 8/2011 He et al. ....................... 370/280
(Continued)

FOREIGN PATENT DOCUMENTS

| JP | 2009-071544 A | 4/2009 |
|---|---|---|
| JP | 2012-516607 A | 7/2012 |
| WO | WO 2008/108227 A1 | 9/2008 |

OTHER PUBLICATIONS

U.S. Appl. No. 61/229,280, Seo et al., "UE Behavior in Case of UL Power Limitation", filed Jul. 29, 2009.*
(Continued)

*Primary Examiner* — Gregory Sefcheck
(74) *Attorney, Agent, or Firm* — Birch, Stewart, Kolasch & Birch, LLP

(57) ABSTRACT

A base station apparatus communicates with a mobile station apparatus transmitting a data signal and a reference signal for channel estimation. The base station includes: a simultaneous transmission setting part which sets simultaneous transmission control information indicating whether or not to enable simultaneous transmission of the data signal and the reference signal, a transmission section which transmits the set simultaneous transmission control information to the mobile station apparatus; and a radio resource control section which determines whether or not to enable simultaneous transmission of the data signal and the reference signal on the basis of a power headroom which is notified from the mobile station apparatus, the headroom being a difference between the maximum transmit power value of the mobile station apparatus and a prescribed power value estimated for uplink transmission.

8 Claims, 10 Drawing Sheets

(51) Int. Cl.
*H04L 5/00* (2006.01)
*H04W 52/34* (2009.01)
*H04L 27/26* (2006.01)

(52) U.S. Cl.
CPC ....... *H04W 72/0473* (2013.01); *H04L 5/0053* (2013.01); *H04L 27/2614* (2013.01); *H04W 52/34* (2013.01)

(56) References Cited

U.S. PATENT DOCUMENTS

| | | | |
|---|---|---|---|
| 8,274,969 B2* | 9/2012 | Wu | 370/354 |
| 8,355,388 B2* | 1/2013 | Womack et al. | 370/338 |
| 8,537,876 B2* | 9/2013 | Hooli et al. | 375/133 |
| 8,724,488 B2* | 5/2014 | Shin et al. | 370/252 |
| 8,811,249 B2* | 8/2014 | Seo et al. | 370/311 |
| 8,818,442 B2* | 8/2014 | Seo et al. | 455/522 |
| 2010/0091725 A1 | 4/2010 | Ishii | |
| 2010/0091726 A1 | 4/2010 | Ishii et al. | |
| 2010/0091727 A1 | 4/2010 | Ishii | |
| 2010/0098008 A1 | 4/2010 | Ishii et al. | |
| 2010/0099429 A1 | 4/2010 | Ishii et al. | |
| 2010/0111008 A1 | 5/2010 | Ishii | |
| 2010/0150085 A1 | 6/2010 | Ishii et al. | |
| 2010/0246463 A1* | 9/2010 | Papasakellariou et al. | 370/311 |
| 2011/0287804 A1 | 11/2011 | Seo et al. | |
| 2012/0093117 A1* | 4/2012 | Suzuki et al. | 370/329 |
| 2013/0010722 A1* | 1/2013 | Suzuki et al. | 370/329 |
| 2013/0010723 A1* | 1/2013 | Ouchi et al. | 370/329 |
| 2013/0034089 A1* | 2/2013 | Nakashima et al. | 370/337 |

OTHER PUBLICATIONS

U.S. Appl. No. 61/246,489, Seo et al., "UE Behavior in Case of UL Power Limitation", filed Sep. 28, 2009.*
Samsung, "UL Transmission Power Control in LTE-A", 3GPP TSG RAN WG1 #56bis, Seoul, Korea, Mar. 23-27, 2009, R1-091250, pp. 1-5.
Ericsson, "Carrier aggregation in LTE-Advanced", TSG-RAN WG1 #53bis, R1-082468, Warsaw, Poland, Jun. 30-Jul. 4, 2008.
International Search Report for PCT/JP2010/067387 dated Nov. 16, 2010.
Samsung, "UL Transmission Power Control in LTE-A", 3GPP TSG RAN WG1 #58, R1-093395, Shenzhen, China, Aug. 24-28, 2009.
LGE: "UCI trans in case of transmit power limitation", 3GPP DR; R1-092502 LTEA_UCI Piggybacking on Pusch,3rd-Gen Ptr Proj(3GPP), Mobile Comp Ctr; 650, Rte Des Lucioles; F-06921 Sophia-Antipolis Cedex; FR, LA, USA; (Jun. 23, 2009), XP050351009, (4 pgs).
LGE: "Uplink trans under UE transmit power lim in LTE-Advanced", 3GPP Draft; R1-094165 LTEA_ULTXP LIM, 3rd Gen Ptp Proj (3GPP), Mobile Competence Ctr; 650, Rte Des Lucioles; F-06921, Sophia—Antipolis Cedex; FR, no Miyazaki; (Oct. 12, 2009), XP050388635, [ret on Oct. 5, 2009] (3 pg).

* cited by examiner

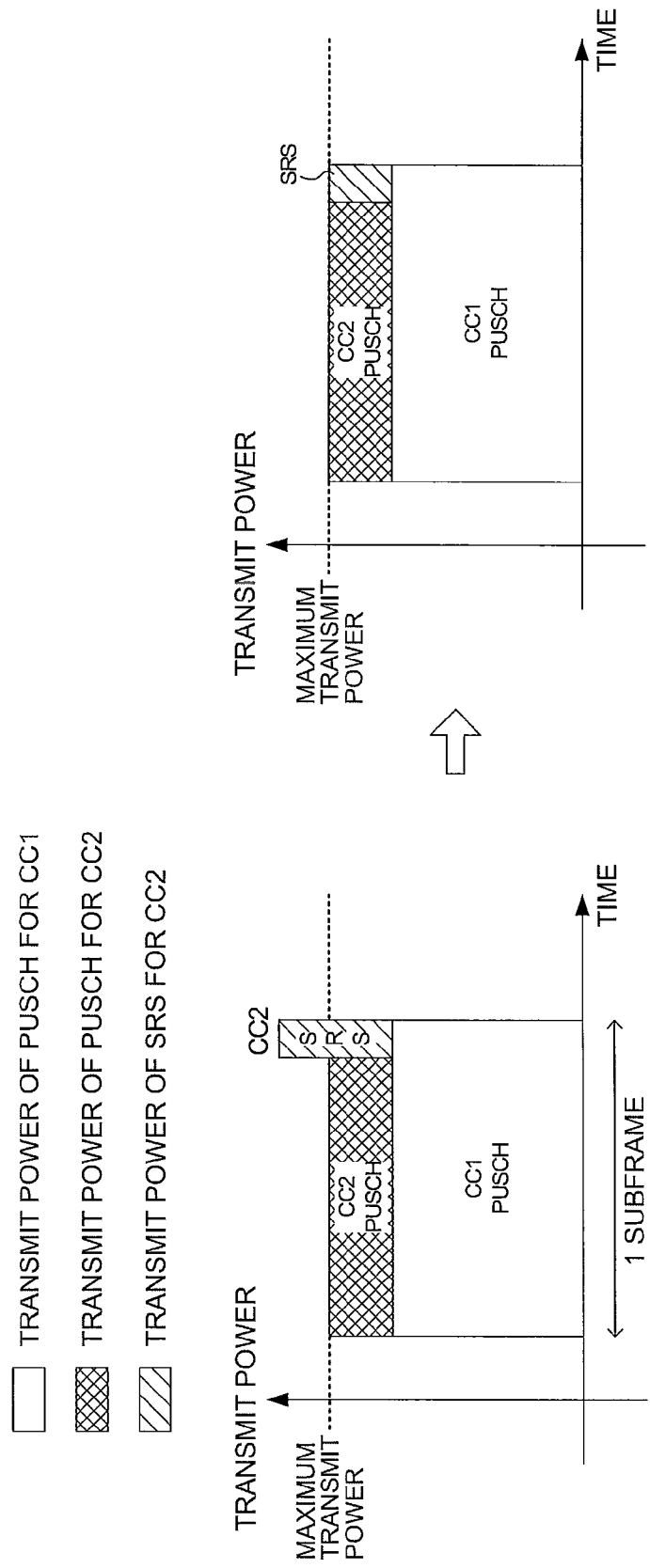

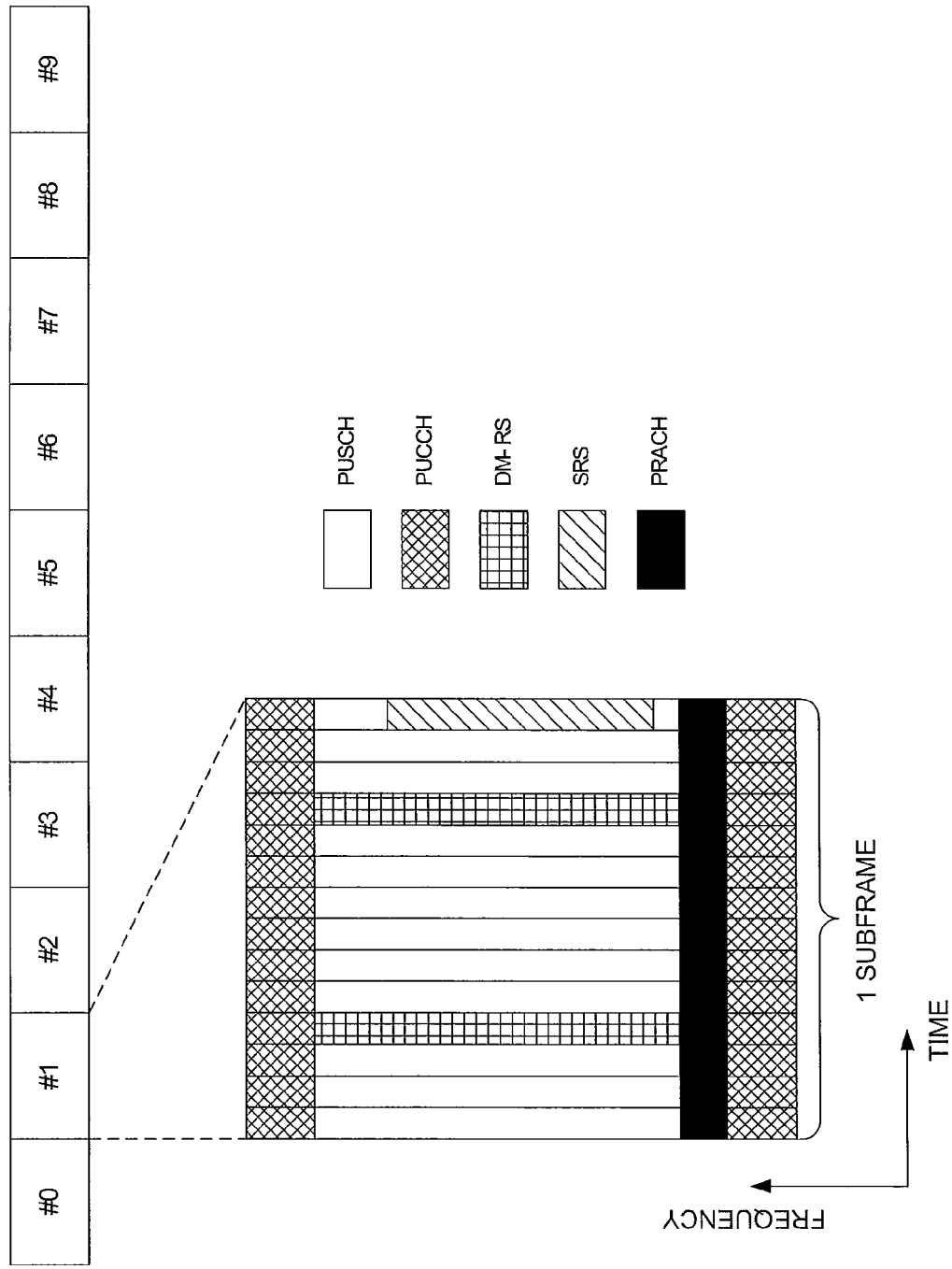

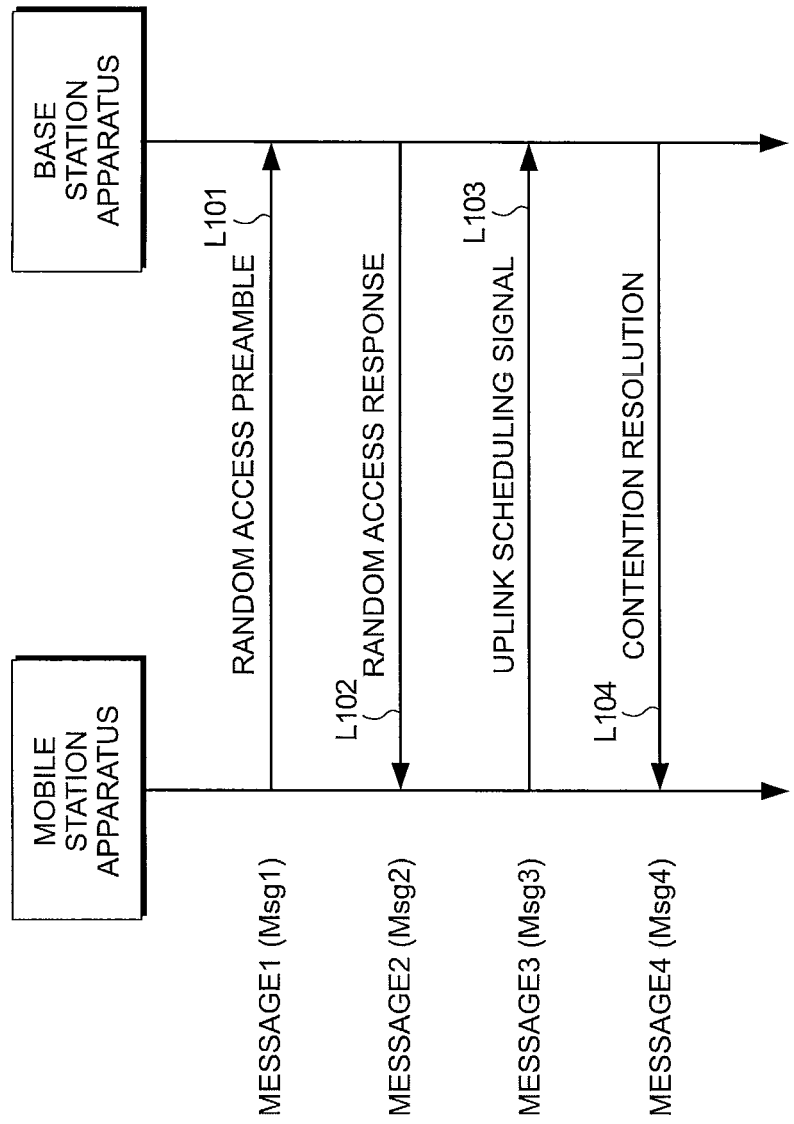

WIRELESS COMMUNICATION SYSTEM, BASE STATION APPARATUS, MOBILE STATION APPARATUS, CONTROL METHOD OF WIRELESS COMMUNICATION SYSTEM, CONTROL PROGRAM OF BASE STATION APPARATUS, AND CONTROL PROGRAM OF MOBILE STATION APPARATUS

TECHNICAL FIELD

The present invention relates to technology in which a mobile station apparatus transmits simultaneously a reference signal for channel estimation and a data signal to a base station apparatus, and, in particular, relates to technology of control (resource assignment control of an uplink signal) which a base station apparatus performs on simultaneous transmission of a reference signal for channel measurement performed by a mobile station and a data signal.

BACKGROUND ART

In standardization organization 3GPP (3rd Generation Partnership Project), an investigation of Evolved Universal Terrestrial Radio Access to which the third generation wireless communication system has been evolved (hereinafter, referred to as EUTRA), and Advanced EUTRA that is a further developed type thereof (also referred to as LTE-Advanced) has been promoted. In the Advanced EUTRA, an SC-FDMA (Single Carrier-Frequency Division Multiple Access) system has been proposed as an uplink communication system.

In the Advanced EUTRA, Carrier Aggregation (frequency band aggregation) has been proposed as a technology enabling higher-speed data transmission while maintaining compatibility with the EUTRA (Non-Patent document 1). The carrier aggregation means, in a wireless communication system which has a transmission apparatus and a reception apparatus, technology enhancing a data rate by preparing a transmission apparatus and a reception apparatus having a reception bandwidth exceeding a transmission bandwidth of the transmission apparatus, transmitting data from a plurality of transmission apparatuses in which a plurality of element frequency bands (also referred to as a component carrier (CC) or a carrier element) different from each other is set, and receiving data transmitted from the plurality of transmission apparatuses in the reception apparatus. In addition, in a wireless communication system which has the transmission apparatus and reception apparatus, the carrier aggregation is technology enhancing a data rate by preparing a reception apparatus and a transmission apparatus having a transmission bandwidth exceeding a reception bandwidth of the reception apparatus, and by that a plurality of reception apparatuses in which component carriers different from each other are set receives data transmitted from the transmission apparatus.

PRIOR ART DOCUMENT

Non-Patent Document

Non-Patent document 1: Ericsson, R1-082468, 3GPP TSG-RAN1 Meeting #53bis, Warsaw, Poland, Jun. 30-Jul. 4, 2008

DISCLOSURE OF THE INVENTION

SUMMARY OF THE INVENTION

Problems to be Solved by the Invention

A mobile station apparatus of the EUTRA was not able to transmit simultaneously a reference signal for channel estimation and a data signal since a single carrier communication method was applied. Therefore, there was a limit for a base station apparatus to perform, for a mobile station apparatus which had a margin in a power headroom (PH), optimal resource allocation in which there was not a waste in a transmit power of the mobile station apparatus. In contrast to this, since not only a single carrier communication method but a multi-carrier communication method is applicable to a mobile station apparatus of the Advanced EUTRA, it is considered that a reference signal for channel estimation and a data signal can be simultaneously assigned in the same time symbol for a mobile station apparatus which does not have a margin in a power headroom.

However, in a mobile station apparatus of the Advanced EUTRA, since different resource allocation methods are applied to a reference signal for channel estimation and a data signal, respectively, a problem arises that a resource allocation which exceeds the maximum transmit power of a mobile station apparatus is performed. A base station apparatus, in order to cope with a case like this, needs to perform optimal resource allocation control based on a power headroom which is notified of from a mobile station apparatus.

The present invention is accomplished in view of the above-mentioned point, and has an object to provide a wireless communication system, a base station apparatus, a mobile station apparatus, a control method of a wireless communication system, a control program of the base station apparatus, and a control program of the mobile station apparatus which are capable of carrying out simultaneous transmission of a reference signal for channel estimation and a data signal while maintaining a quality of a channel for transmitting these signals by performing resource allocation control in accordance with transmit power control using a power headroom or the like of each mobile station apparatus.

Means for Solving the Problem (1) In order to achieve above-mentioned objects, the present invention has taken the following measures. That is, a wireless communication system of the present invention is a wireless communication system comprising a base station apparatus and a mobile station apparatus that transmits a data signal and a reference signal for channel estimation to the base station apparatus, wherein the base station apparatus includes: a simultaneous transmission setting part which sets simultaneous transmission control information indicating whether or not to enable simultaneous transmission of the data signal and the reference signal in the mobile station apparatus; and a transmission section which transmits the set simultaneous transmission control information to the mobile station apparatus, and wherein the mobile station apparatus includes: a reception section which receives simultaneous transmission control information transmitted from the base station apparatus; a simultaneous transmission control part which determines whether or not to transmit simultaneously the data signal and the reference signal to the base station apparatus based on the received simultaneous transmission control information when the data signal and the reference signal are assigned in the same time symbol; and a mobile station side transmission section which transmits simultaneously the data signal and the reference signal to the base station apparatus in the same time symbol when transmitting simultaneously the data signal and the reference signal as a result of the determination.

Thus, the mobile station apparatus determines whether or not to transmit simultaneously a data signal and a reference signal to the base station apparatus on the basis of the received simultaneous transmission control information when the data signal and the reference signal are assigned in the same time symbol, and thereby, the base station apparatus will be able to carry out optimal resource allocation control in accordance with a power headroom of the mobile station apparatus.

(2) In the wireless communication system of the present invention, the simultaneous transmission control part, when the simultaneous transmission control information indicates that simultaneous transmission of the data signal and the reference signal is enabled, performs control so as to allocate the data signal in a time symbol to which the reference signal is allocated, while when the simultaneous transmission control information indicates that the data signal and the reference signal is not enabled, performs control so as to change resource allocation of the data signal so that the data signal is not allocated in a time symbol to which the reference signal is allocated.

Thus, when the simultaneous transmission control information indicates not to enable simultaneous transmission of the data signal and the reference signal, performed is control so as to change resource allocation of the data signal so that the data signal may not be allocated in a time symbol to which the reference signal is allocated, and thereby, the base station apparatus can always guarantee a channel quality of the reference signal for channel estimation. In an environment where a movement speed of the mobile station apparatus is fast, and where a channel quality changes frequently, control of resource allocation of an uplink signal in accordance with the channel quality of the mobile station apparatus can be performed by increasing a frequency of channel estimation.

(3) In the wireless communication system of the present invention, the simultaneous transmission control part, when the simultaneous transmission control information indicates that simultaneous transmission of the data signal and the reference signal is enabled, performs control so as to allocate the data signal in a time symbol to which the reference signal is allocate, while when the simultaneous transmission control information indicates that simultaneous transmission of the data signal and the reference signal is not enabled, performs control so as not to transmit the reference signal in a time frame for transmitting the data signal.

Thus, when simultaneous transmission control information indicates not to enable simultaneous transmission of the data signal and the reference signal, performed is control so as not to transmit the reference signal in a time frame for transmitting the data signal, and thereby, the base station apparatus can always guarantee a communication quality such as a transmission speed of the data signal. This is effective when a lot of data signals are desired to be transmitted, or when the mobile station apparatus does not move at all, that is, in a case of an environment where a channel quality does not change.

(4) In the wireless communication system of the present invention, the simultaneous transmission control part, when the simultaneous transmission control information indicates that simultaneous transmission of the data signal and the reference signal is not enabled, if single transmission is set insetting information of the reference signal, performs control so as to change resource allocation of the data signal so that the data signal is not allocated in a time symbol to which the reference signal is allocated, while when single transmission is not set in setting information of the reference signal, performs control based on the simultaneous transmission control information.

Thus, the mobile station apparatus, when single transmission is set in setting information of the reference signal, performs control so as to change resource allocation of the data signal so that the data signal may not be allocated in a time symbol to which the reference signal is allocated, and thereby, the base station apparatus can prioritize the channel estimation.

(5) In the wireless communication system of the present invention, the simultaneous transmission setting part, when simultaneous transmission control information indicating that simultaneous transmission of the data signal and the reference signal is not enabled is set, further includes, in the simultaneous transmission control information, information indicating to perform control so as not to transmit the reference signal in the same time frame as the data signal, or to perform control so as to change resource allocation of the data signal so that the data signal is not allocated in a time symbol to which the reference signal is allocated, and notifies the mobile station apparatus of it via the transmission section, while the simultaneous transmission control part, when the simultaneous transmission control information indicates that simultaneous transmission of the data signal and the reference signal is not enabled, performs, in a switching manner, one of control so as not to transmit the reference signal in the same time frame as the data signal, and control so as to change resource allocation of the data signal so that the data signal is not allocated in a time symbol to which the reference signal is allocated.

Thus, the base station apparatus includes, in the simultaneous transmission control information, information indicating to perform control so as not to transmit the reference signal in the same time frame as the data signal, or to perform control so as to change resource allocation of the data signal so that the data signal may not be allocated in a time symbol to which the reference signal is allocated, and thereby, the mobile station apparatus can carry out the control on the basis of the simultaneous transmission control information when simultaneous transmission of the data signal and the reference signal is not enabled.

(6) In the wireless communication system of the present invention, the simultaneous transmission control part, when the simultaneous transmission control information indicates that simultaneous transmission of the data signal and the reference signal is enabled, performs control so as to allocate the data signal and the reference signal in the same time frame, while when the simultaneous transmission control information indicates that simultaneous transmission of the data signal and the reference signal is not enabled, performs in accordance with a type of information of the data signal, in a switching manner, one of control so as not to transmit the reference signal in the same time frame as the data signal, and control so as to change resource allocation of the data signal so that the data signal is not allocated in a time symbol to which the reference signal is allocated.

Thus, when the simultaneous transmission control information indicates not to enable simultaneous transmission of the data signal and the reference signal, in accordance with a type of information of the data signal, performed is, in a switching manner, one of control so as not to transmit the reference signal in the same time frame as the data signal, and control so as to change resource allocation of the data signal so that the data signal may not be allocated in a time symbol to which the reference signal is allocated, and thereby, the mobile station apparatus can carryout control so as not to transmit (drop) the reference signal for channel estimation in the same time frame as the data signal when important information for performing communication is assigned to the data signal.

(7) In the wireless communication system of the present invention, the simultaneous transmission control part, when the simultaneous transmission control information indicates that simultaneous transmission of the data signal and the reference signal is not enabled, if the data signal and the reference signal are assigned in the same time symbol, and a message 3 is assigned to the data signal, performs control so as not to transmit the reference signal in the same time frame as the data signal, while when a message 3 is not assigned to the data signal, performs control so as to change resource allocation of the data signal so that the data signal is not allocated in a time symbol to which the reference signal is allocated.

Thus, when the simultaneous transmission control information indicates not to enable simultaneous transmission of the data signal and the reference signal, when the data signal and the reference signal are assigned in the same time symbol and a message 3 is assigned to the data signal, performed is control so as not to transmit the reference signal in the same time frame as the data signal, while, when a message 3 is not assigned to the data signal, performed is control so as to change resource allocation of the data signal so that the data signal may not be allocated in a time symbol to which the reference signal is allocated, and thereby, the base station apparatus can avoid a state where a data signal can not be demodulated when resource allocation is changed and a message 3 is transmitted from the mobile station apparatus in a state where from which mobile station apparatus the message 3 has been transmitted is not recognized in a transmission phase of a message 3 of the mobile station apparatus.

(8) In the wireless communication system of the present invention, the simultaneous transmission setting part, when setting simultaneous transmission control information indicating that simultaneous transmission of the data signal and the reference signal is enabled, and assigning the data signal and the reference signal in the same time symbol, for a mobile station apparatus in which the sum total transmit power of the data signal and the reference signal becomes not less than maximum transmit power, includes, in the simultaneous transmission control information, information indicating to perform control so as to reduce only transmit power of the data signal and notifies the mobile station apparatus of it via the transmission section, while the simultaneous transmission control part, when the simultaneous transmission control information indicates that simultaneous transmission of the data signal and the reference signal is enabled, if the sum total transmit power of the data signal and the reference signal is less than the maximum transmit power, performs control so as to allocate the data signal and the reference signal in the same time symbol, while, if the sum total transmit power of the data signal and the reference signal is not less than the maximum transmit power, performs control so as to reduce transmit power of the data signal so that the sum total data signal and the reference signal becomes less than the maximum transmit power, and transmits simultaneously the data signal and the reference signal.

Thus, when the data signal and the reference signal are assigned in the same time symbol, for the mobile station apparatus in which the sum total transmit power of the data signal and the reference signal becomes not less than the maximum transmit power, the base station apparatus includes information indicating to perform control so as to reduce only the transmit power of the data signal in the simultaneous transmission control information, and thereby, can determine whether or not there is any band having a better communication state than a band currently used by the mobile station apparatus by prioritizing the reference signal for channel estimation. As a result of the channel estimation, if the base station apparatus can perform a scheduling so that the base station apparatus may assign the data signal of the mobile station apparatus to a band where a communication state is good, a communication quality of the data signal of the mobile station apparatus can be improved.

(9) In the wireless communication system of the present invention, the simultaneous transmission setting part, when setting simultaneous transmission control information indicating that simultaneous transmission of the data signal and the reference signal is enabled, and assigning the data signal and the reference signal in the same time symbol, for a mobile station apparatus in which the sum total transmit power of the data signal and the reference signal becomes not less than maximum transmit power, includes, in the simultaneous transmission control information, information indicating to perform control so as to reduce only transmit power of the reference signal, and notifies the mobile station apparatus of it via the transmission section, while the simultaneous transmission control part, when the simultaneous transmission control information indicates that simultaneous transmission of the data signal and the reference signal is enabled, if the sum total transmit power of the data signal and the reference signal is less than the maximum transmit power, performs control so as to allocate the data signal and the reference signal in the same time symbol, while, if the sum total transmit power of the data signal and the reference signal is not less than the maximum transmit power, performs control so as to reduce transmit power of the reference signal so that the sum total data signal and the reference signal becomes less than the maximum transmit power, and transmits simultaneously the data signal and the reference signal.

Thus, the base station apparatus, when the data signal and the reference signal are assigned in the same time symbol, for the mobile station apparatus in which the sum total transmit power of the data signal and the reference signal becomes not less than the maximum transmit power, includes, in the simultaneous transmission control information, information indicating to perform control so as to reduce only transmit power of the reference signal, and thereby, can guarantee a communication quality such as a transmission speed of the data signal by maintaining the transmit power of the data signal.

(10) A base station apparatus of the present invention is a base station apparatus which communicates with a mobile station apparatus that transmits a data signal and a reference signal for channel estimation, comprising: a simultaneous transmission setting part which sets simultaneous transmission control information indicating whether or not to enable simultaneous transmission of the data signal and the reference signal in the mobile station apparatus; and a transmission section which transmits the set simultaneous transmission control information to the mobile station apparatus.

Thus, the base station apparatus sets simultaneous transmission control information indicating whether or not to enable simultaneous transmission of the data signal and the reference signal in the mobile station apparatus, and thereby, will be able to carry out optimal resource allocation control in accordance with a power headroom of the mobile station apparatus.

(11) In the base station apparatus of the present invention, the base station apparatus further comprises a radio resource control section which determines whether or not to enable simultaneous transmission of the data signal and the reference signal based on a power headroom which is notified of from the mobile station apparatus and is a difference between a maximum transmit power value of the mobile station apparatus and a prescribed power value estimated for uplink transmission.

Thus, the base station apparatus determines whether or not to enable simultaneous transmission of the data signal and the reference signal based on a power headroom which is a difference between the maximum transmit power value of the mobile station apparatus and a prescribed power value estimated for uplink transmission, and thereby, can carry out optimal resource allocation control in accordance with a power headroom of the mobile station apparatus.

(12) A mobile station apparatus of the present invention is a mobile station apparatus which transmits a data signal and a reference signal for channel estimation to a base station apparatus, comprising: a reception section which receives, from the base station apparatus simultaneous, transmission control information indicating whether or not to enable simultaneous transmission of the data signal and the reference signal; a simultaneous transmission control part which determines whether or not to transmit simultaneously the data signal and the reference signal to the base station apparatus on the basis of the received simultaneous transmission control information when the data signal and the reference signal are assigned in the same time symbol; and a mobile station side transmission section which transmits simultaneously the data signal and the reference signal to the base station apparatus when transmitting simultaneously the data signal and the reference signal as a result of the determination.

Thus, the mobile station apparatus determines whether or not to transmit simultaneously the data signal and the reference signal to the base station apparatus based on the received simultaneous transmission control information when the data signal and the reference signal are assigned in the same time symbol, and thereby, the base station apparatus can carry out optimal resource allocation control in accordance with a power headroom of the mobile station apparatus.

(13) A control method of the wireless communication system of the present invention is a control method of a wireless communication system which includes a base station apparatus and a mobile station apparatus that transmits a data signal and a reference signal for channel estimation to the base station apparatus, the control method comprising at least the steps of: in the base station apparatus, setting simultaneous transmission control information indicating whether or not to enable simultaneous transmission of the data signal and the reference signal in the mobile station apparatus; and transmitting the set simultaneous transmission control information to the mobile station apparatus, and in the mobile station apparatus, receiving simultaneous transmission control information transmitted from the base station apparatus; determining whether or not to transmit simultaneously the data signal and the reference signal to the base station apparatus on the basis of the received simultaneous transmission control information when the data signal and the reference signal are assigned in the same time symbol; and transmitting simultaneously the data signal and the reference signal to the base station apparatus when transmitting simultaneously the data signal and the reference signal as a result of the determination.

Thus, the base station apparatus sets the simultaneous transmission control information indicating whether or not to enable simultaneous transmission of the data signal and the reference signal in the mobile station apparatus, and thereby, can carry out optimal resource allocation control in accordance with a power headroom of the mobile station apparatus.

(14) A control program of the base station apparatus of the present invention is a control program of a base station apparatus communicating with a mobile station apparatus that transmits a data signal and a reference signal for channel estimation, wherein the control program converts a series of processing into commands so as to enable a computer to read and execute them, the series of processing including processing of: determining, in a radio resource control section, whether or not to enable simultaneous transmission of the data signal and the reference signal on the basis of a power headroom which is notified of from the mobile station apparatus and is a difference between a maximum transmit power value of the mobile station apparatus and a prescribed power value estimated for uplink transmission; setting, in a simultaneous transmission setting part, simultaneous transmission control information indicating whether or not to enable simultaneous transmission of the data signal and the reference signal in the mobile station apparatus; and transmitting, in a transmission section, the set simultaneous transmission control information to the mobile station apparatus.

Thus, the base station apparatus determines whether or not to enable simultaneous transmission of the data signal and the reference signal based on a power headroom which is a difference between the maximum transmit power value of the mobile station apparatus and a prescribed power value estimated for uplink transmission, and thereby, will be able to carry out optimal resource allocation control in accordance with a power headroom of the mobile station apparatus.

(15) A control program of the mobile station apparatus of the present invention is a control program of a mobile station apparatus that transmits a data signal and a reference signal for channel estimation to a base station apparatus, wherein the control program converts a series of processing into commands so as to enable a computer to read and execute them, the series of processing including processing of: receiving, in a reception section, simultaneous transmission control information indicating whether or not to enable simultaneous transmission of the data signal and the reference signal from the base station apparatus; determining, in a simultaneous transmission control part, whether or not to transmit simultaneously the data signal and the reference signal to the base station apparatus on the basis of the received simultaneous transmission control information when the data signal and the reference signal are assigned in the same time symbol; and transmitting, in a mobile station side transmission section, simultaneously the data signal and the reference signal to the base station apparatus when transmitting simultaneously the data signal and the reference signal as a result of the determination.

Thus, the mobile station apparatus determines whether or not to transmit simultaneously the data signal and the reference signal to the base station apparatus based on the received simultaneous transmission control information when the data signal and the reference signal are assigned in the same time symbol, and thereby, the base station apparatus will be able to carry out optimal resource allocation control in accordance with a power headroom of the mobile station apparatus.

Effect of the Invention

According to the present invention, the base station apparatus can instruct the mobile station apparatus having a margin in a power headroom to transmit simultaneously the reference signal for channel estimation and the data signal. Thereby, the base station apparatus will be able to perform optimal resource allocation in which there is not a waste in the transmit power of the mobile station apparatus. To the mobile station apparatus in which there is no margin in a power headroom, or in which a power headroom becomes negative due to carrying out simultaneous transmission of the reference signal for channel estimation and the data signal, the base station apparatus can set so that the reference signal for channel estimation and the data signal may not be transmitted simultaneously, and so that one of the reference signal for channel estimation and the data signal may be transmitted. Thereby, when it is set so that the reference signal for channel estimation may be transmitted, a channel quality of the reference signal for channel estimation can always be guaranteed, and when it is set so that the data signal may be transmitted, a communication quality such as a transmission speed of the data signal can always be guaranteed.

BRIEF DESCRIPTION OF THE DRAWINGS

FIG. 8 is a schematic diagram of transmit power distribution of a time symbol of an uplink signal of the mobile station apparatus 3 according to a fifth embodiment of the present invention;

FIG. 9 is a figure showing a schematic configuration of an uplink signal; and

FIG. 10 is a sequence chart showing an example of a procedure of the contention based random access.

BEST MODES FOR CARRYING OUT THE INVENTION

Figure 1:
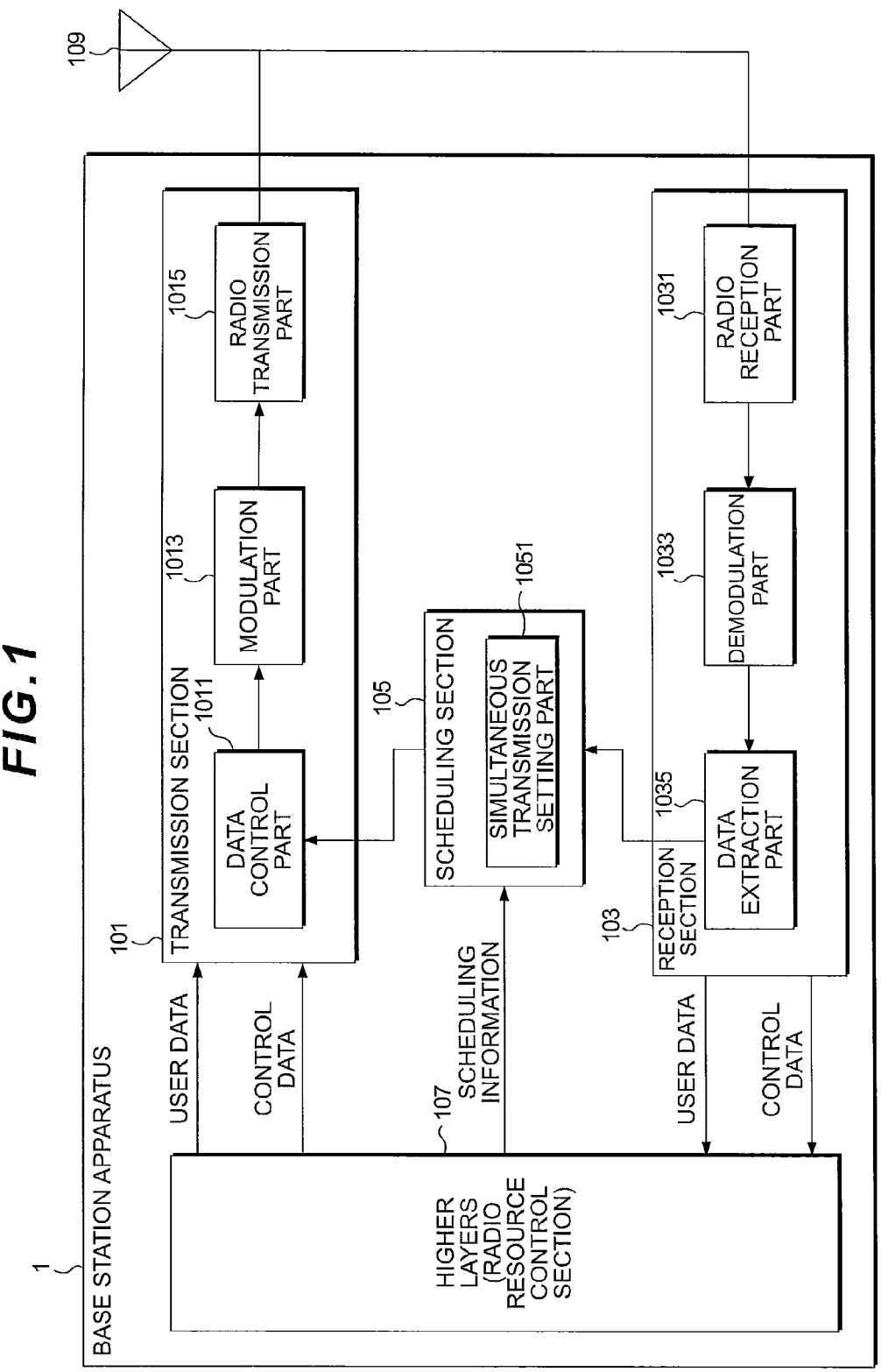
FIG. 1 is a block diagram showing a schematic functional configuration of a base station apparatus 1 of the present invention.

Before starting specific description of each embodiment, an outline of communication technology which is used in the present invention will be described briefly.

(1) Physical Channel

In a physical channel used in the EUTRA and Advanced EUTRA, there are included a physical broadcast channel, a downlink shared channel, a downlink control channel, a downlink reference signal, an uplink shared channel, an uplink control channel, a random access channel, and an uplink reference signal or the like. Although types of physical channels may be added from now on, or channel structures may be changed in the EUTRA and Advanced EUTRA, even when a change like this is done, each embodiment of the present invention described later is applicable.

The physical broadcast channel (PBCH) carries out mapping of a broadcast channel (BCH) in an interval of 40 milliseconds. As for the timing of 40 milliseconds, a blind detection is carried out. That is, for timing indication, an explicit signaling is not performed. A subframe including a physical broadcast channel (PBCH) can be decoded only by the subframe (self-decodable). A physical downlink control channel (PDCCH) is a downlink channel transmitted to a mobile station apparatus from a base station apparatus, and is used in common for a plurality of mobile station apparatuses.

The base station apparatus uses the downlink control channel for transmission of transmission timing information and scheduling information (uplink/downlink resource allocation information). The physical downlink shared channel (PDSCH) is a channel used for transmitting downlink data or paging information.

The downlink reference signal (DL-RS) is transmitted to the mobile station apparatus from the base station apparatus using a downlink channel. The mobile station apparatus determines a downlink reception quality by measuring the downlink reference signal. A reception quality is notified of to the base station apparatus, using the physical uplink control channel (PUCCH) as CQI (Channel Quality Indicator) that is a quality information index. The base station apparatus performs scheduling of downlink communication to the mobile station apparatus based on the CQI notified of from the mobile station apparatus. Besides, as a reception quality, SIR (Signal-to-Interference Ratio), SINR (Signal-to-Interference plus Noise Ratio), SNR (Signal-to-Noise Ratio), CIR (Carrier-to-Interference Ratio), BLER (Block Error Rate), a path loss or the like can be used.

The physical uplink shared channel (PUSCH) is a channel used for mainly transmitting uplink data (UL-SCH: Uplink Shared Channel). When the base station apparatus has carried out scheduling of the mobile station apparatus, channel status information (the channel quality indicator CQI of a downlink, a pre-coding matrix indicator (PMI), a rank indicator (RI)) and acknowledgment (ACK)/negative acknowledgment (NACK) for a hybrid automatic repeat request (HARQ) for downlink transmission are also transmitted using the physical uplink shared channel (PUSCH). Here, the uplink data (UL-SCH) indicates transmission of user's data, for example, and the UL-SCH is a transport channel. In the UL-SCH, the HARQ and dynamic adaptation radio link control are supported, and beam-forming is available. As for the UL-SCH, a dynamic resource allocation and a quasi-static resource allocation are supported.

The physical uplink control channel (PUCCH) is a channel used for transmitting control data. Here, the control data includes the channel status information (CQI, PMI, RI), for example, transmitted (feedback) to the base station apparatus from the mobile station apparatus, a scheduling request (SR) where the mobile station apparatus requests assignment of resources for transmitting uplink data (transmission by the UL-SCH is requested), and ACK/NACK of the HARQ for downlink transmission or the like.

The uplink reference signal (UL-RS) is transmitted to the base station apparatus from the mobile station apparatus. In the UL-RS, there are a sounding reference signal (SRS) and a demodulation reference signal (DM-RS). The sounding reference signal that is a reference signal for channel estimation is a reference signal for uplink reception quality estimation which is measured by the base station apparatus, and is judged with respect to a reception quality of an uplink radio transmission signal of the mobile station apparatus, and is used for uplink scheduling and adjustment of uplink timing synchronization on the basis of the reception quality. The demodulation reference signal is transmitted together with an uplink shared channel, and is used also as a reference signal for calculating a variation amount of an amplitude, phase, and frequency of a signal of an uplink shared channel and for demodulating a signal transmitted using the uplink shared channel. A bandwidth of a channel for the SRS is determined in accordance with a bandwidth of the base station apparatus. Frequency hopping is applied to the SRS for a time axis link. By using this frequency hopping, a frequency diversity effect and an interference equalization effect are acquired.

The physical random access channel (PRACH) is a physical channel used for transmitting a random access preamble, and has a guard time. The PRACH makes it the greatest object that the mobile station apparatus is synchronized with the base station apparatus, and other than that, is used for an initial access, a handover, a re-connection request, and a scheduling request.

(2) Uplink Signal Configuration

An uplink signal configuration will be described. FIG. 9 is a figure showing a schematic configuration of an uplink signal. In the same figure, the horizontal axis is time, and the vertical axis is frequency. In an example of the same figure, 14 symbols are located side by side in a time axis direction. 7 symbols correspond to 1 slot, and a length of 1 slot is 0.5 millisecond (ms). 14 symbols (corresponding to 2 slots) correspond to 1 subframe, and a length of 1 subframe is 1 millisecond.

Thus, the SRS is assigned to the 14th symbol in an uplink signal where 1 subframe is constituted by 14 symbols. The SRS resource (bandwidth in a frequency direction) assigned to the 14th symbol is set in accordance with an uplink system bandwidth or a transmit power of the mobile station apparatus. The PRACH can change and allocate a bandwidth and a time symbol length in accordance with a type and format of a message to be transmitted. In the mobile station apparatus of the EUTRA, a plurality of PUSCHs and SRSs were not simultaneously transmitted from one mobile station apparatus because of single-carrier transmission, and however, in the Advanced EUTRA, since multi-carrier communication has become enabled also in uplink communication, the base station apparatus can also configure for the mobile station apparatus having a margin in a transmit power to perform simultaneous transmission of the PUSCH and the SRS.

(3) Random Access Method

In the PRACH, there are access methods of a contention based random access and a non-contention based random access. The contention based random access is a random access where there may be a collision among the mobile station apparatuses, and is an access method of a random access usually performed. On the other hand, the non-contention based random access is a random access where there is not a collision among the mobile station apparatuses, and is performed on the initiative of the base station apparatus in a special case of a handover or the like for synchronization of an uplink between the mobile station apparatus and the base station apparatus promptly. Besides, the base station apparatus, when it cannot make the mobile station apparatus carry out the non-contention based random access, may make the mobile station apparatus carry out the contention based random access.

FIG. 10 is a sequence chart showing an example of a procedure of the contention based random access. First, from a random ID, downlink path loss information, or the like, the mobile station apparatus selects a random access preamble, and transmits only the random access preamble by the PRACH (message 1 (Msg1) (Step L101)).

The base station apparatus, if receiving the random access preamble from the mobile station apparatus, calculates a synchronous timing shift between the mobile station and the base station from the random access preamble, and performs scheduling for transmitting L2/L3 messages, and allocates a temporary cell-radio network temporary identity (hereinafter, referred to as Temporary C-RNTI), and arranges, in the PDCCH, a RA-RNTI (Random Access-Radio Network Temporary Identity) indicating that included is a response addressed to the mobile station apparatus which has transmitted the random access preamble to the PDSCH, and transmits, to the PDSCH, a random access response including synchronous timing shift information (Timing Advance), scheduling information, Temporary C-RNTI and a random access preamble number of the received random access preamble (or the random ID) (message 2 (Msg2) (Step L102)). Besides, a different RA-RNTI is used for a different PRACH.

The mobile station apparatus, if confirming that there is the RA-RNTI in the PDCCH, confirms contents of the random access response allocated in the PDSCH, and extracts the response where the random access preamble number (or the random ID) which it has transmitted is included, and acquires the synchronous timing shift information, and corrects the uplink transmission timing, and transmits L2/L3 messages including at least the C-RNTI in the scheduled radio resources (or a UEID (a mobile station apparatus ID) such as a contention resolution ID (a random value for an initial access or s-TMSI (System Architecture Evolution-Temporary Mobile Subscriber Identity))) (message 3 (Msg3) (Step L103)).

The base station apparatus, if receiving the L2/L3 messages from the mobile station apparatus, transmits, to the mobile station apparatus, a contention resolution for judging whether a collision has occurred among the mobile station apparatuses using the C-RNTI (or Temporary C-RNTI) included in the received L2/L3 messages (message 4 (Msg4) (Step L104)). The mobile station apparatus, when having transmitted the contention resolution ID by the message 3 (when the message 3 is a common control channel (CCCH)), judges whether the random access processing is successful or not depending on whether the contention resolution ID included in the L2/L3 messages received by the contention resolution is one which has been transmitted by itself. The mobile station apparatus, when having transmitted the C-RNTI by the message 3, judges whether the random access processing is successful or not by detecting the C-RNTI in the PDCCH from the base station apparatus.

Here, as for the contention resolution, the mobile station apparatus ID (the C-RNTI or the contention resolution ID) is included in the message 3 (the L2/L3 messages) and is transmitted to the base station apparatus, and the base station apparatus transmits the message 4 (the contention resolution) to the mobile station apparatus as the response thereto. Then, the base station apparatus includes the mobile station apparatus ID transmitted from the mobile station apparatus in the response to the message 3 and transmits it. The mobile station apparatus confirms its own ID within the message 4, and thereby, can confirm that an access to the base station apparatus has been accomplished. When the mobile station apparatus fails in the reception of the message 2, or the contention resolution goes wrong, the procedures are redone from the message 1. Hereinafter, embodiments of the present invention will be described with reference to drawings.

<First Embodiment>

A first embodiment will be described hereinafter. In the first embodiment, a base station apparatus comprises: a simultaneous transmission setting part which sets simultaneous transmission control information indicating whether to make enabled simultaneous transmission of a data signal and a reference signal for channel estimation in a mobile station apparatus; and a transmission section which transmits simultaneous transmission control information to the mobile station apparatus. The mobile station apparatus comprises: a reception section which receives the simultaneous transmission control information transmitted from the base station apparatus; a simultaneous transmission control part which determines whether to carry out simultaneous transmission of the data signal and the reference signal for channel estimation based on the received simultaneous transmission control information when a data signal and a reference signal for channel estimation are assigned in the same time symbol; and a transmission section which transmits simultaneously the data signal and the reference signal for channel estimation to the base station apparatus when transmitting simultaneously the data signal and the reference signal for channel estimation as the result of judgment.

In the first embodiment, the simultaneous transmission control information which switches whether to carry out simultaneous transmission of a sounding reference signal (reference signal for channel estimation) and a physical uplink shared channel (data signal) is set and transmitted to the mobile station apparatus. The mobile station apparatus, when it is set by the base station apparatus that simultaneous transmission of the data signal and the reference signal for channel estimation may be carried out, can transmit simultaneously the data signal and the reference signal for channel estimation even when the reference signal for channel estimation and the data signal are assigned in the same time symbol. In addition, in the first embodiment, when the base station apparatus has set so that simultaneous transmission of a data signal and a reference signal for channel estimation must not be carried out, the information that a resource allocation is changed so that a data signal may not be transmitted in the same time symbol as a reference signal for channel estimation can be set in the simultaneous transmission control information.

In the first embodiment, when simultaneous transmission of a reference signal for channel estimation and a data signal may be carried out, and when the simultaneous transmission must not be carried out, the simultaneous transmission control information for switching whether to change a resource allocation of the data signal can be set by the base station apparatus, and the mobile station apparatus can switch whether to carry out simultaneous transmission based on the simultaneous transmission control information. Here, the simultaneous transmission control information may be determined by a system uniquely in advance, and may be simultaneously notified of to the mobile station apparatus from the base station apparatus as broadcast information, and may be notified of to each mobile station apparatus from the base station apparatus.

FIG. 1 is a block diagram showing a schematic functional configuration of a base station apparatus 1 of the present invention. The base station apparatus 1 includes a transmission section 101, a reception section 103, a scheduling section 105, higher layers (radio resource control section) 107, and an antenna 109. The transmission section 101 includes a data control part 1011, a modulation part 1013, and a radio transmission part 1015. The reception section 103 includes a radio reception part 1031, a demodulation part 1033, and a data extraction part 1035. The data control part 1011 accepts user data and control data, and by an instruction from the scheduling section 105, arranges the control data in a PDCCH and arranges transmission data and control data for each mobile station apparatuses 3 in a PDSCH. The modulation part 1013 performs signal processing, such as data modulation, a serial/parallel conversion of an input signal, IFFT, CP insertion, and filtering, and generates a transmission signal. The radio transmission part 1015 carries out up-conversion of the modulated data to a radio frequency and thereafter, transmits it to the mobile station apparatus 3 via the antenna 109.

The radio reception part 1031 receives an uplink signal from the mobile station apparatus 3, and carries out down-conversion to a baseband signal, and outputs the received data to the demodulation part 1033. The data extraction part 1035 confirms whether the received data is correct or incorrect, and notifies the scheduling section 105 of the confirmation result. The data extraction part 1035, when the received data are correct, separates the received data into user data and control data. The data extraction part 1035 outputs the second layer control data such as downlink channel quality instruction information and acknowledgement/negative-acknowledgment (ACK/NACK) of downlink data within the control data to the scheduling section 105, and outputs control data and user data of the other third layer or the like to the higher layers (radio resource control section) 107. The data extraction part 1035, when the received data are incorrect, saves the received data in order to synthesize it with retransmission data, and when the retransmission data are received, performs the synthesizing processing.

The scheduling section 105 performs scheduling for arranging user data and control data to a PDSCH or a PDCCH. The scheduling section 105 is provided with the simultaneous transmission setting part 1051, and includes, in the simultaneous transmission control information, a determination result which is sent from the higher layers (radio resource control section) 107, and which is regarding whether the mobile station apparatus 3 may perform simultaneous transmission of a data signal and a reference signal for channel estimation, and performs setting of simultaneous transmission, and can notify the mobile station apparatus 3 of it.

The higher layers (radio resource control section) 107 performs processing of a medium access control (MAC) layer, a radio link control (RLC: Radio Link Control) layer, a packet data convergence protocol (PDCP) layer, and a radio resource control (RRC) layer. Since the higher layers (radio resource control section) 107 integrates and controls a processing part of a lower layer, interfaces between the higher layers (radio resource control section) 107 and the scheduling section 105, the antenna 109, the transmission section 101 and the reception section 103 exists (not shown). The higher layers (radio resource control section) 107 determines whether the mobile station apparatus 3 may perform simultaneous transmission of a data signal and a reference signal for channel estimation from the power headroom of the uplink signal transmitted from the mobile station apparatus 3, and can instruct the simultaneous transmission setting part 1051 to include it in the simultaneous transmission control information.

The higher layers (radio resource control section) 107, when a power headroom of an uplink signal is positive, and where the number of radio resources of a data signal (or reference signal for channel estimation) to be added for simultaneous transmission is smaller than a prescribed threshold value, judges that the a power headroom has a margin, and determines that the mobile station apparatus 3 may perform simultaneous transmission of the data signal and the reference signal for channel estimation. The higher layers (radio resource control section) 107, when a power headroom of an uplink signal is negative, judges that it has demanded a transmit power exceeding a maximum transmit power value of the mobile station apparatus 3 from the mobile station apparatus 3 (there is no margin in a power headroom of the mobile station apparatus 3), and sets the mobile station apparatus 3 so that the simultaneous transmission must not be carried out. The higher layers (radio resource control section) 107, from a power headroom and a bandwidth of a data signal of the mobile station apparatus 3 (the number of radio resources) or a path loss, can estimate how many numbers of radio resources in addition can be allocated to this mobile station apparatus 3.

When a bandwidth of a reference signal for channel estimation (the number of radio resources) is less than the number of radio resources estimated from a power headroom, the higher layers (radio resource control section) 107 determines that the mobile station apparatus 3 may perform simultaneous transmission of a data signal and a reference signal for channel estimation. Here, the prescribed threshold value means the number of radio resources of the data signal or the reference signal for channel estimation which can be estimated from a power headroom and which can be added to the mobile station apparatus 3. For example, when 5 MHz is the number of radio resources which can be estimated from a power headroom of the mobile station apparatus 3 transmitting a 10 MHz data signal, and which can be added to the mobile station apparatus 3, if the channel estimation reference signal having the number of radio resources of 10 MHz set in advance in the mobile station apparatus 3 is going to be transmitted simultaneously with a 10 MHz data signal, it is clear to exceed a maximum transmit power value of the mobile station apparatus 3, and therefore, the higher layers (radio resource control section) 107 determines that the mobile station apparatus 3 must not perform simultaneous transmission. The prescribed threshold value may be set by a system uniquely in advance, and may be simultaneously notified of to the mobile station apparatus 3 from the base station apparatus 1 as broadcast information, and may be notified of to each mobile station apparatus 3 from the base station apparatus 1.

Here, a power headroom means a difference between a maximum transmit power value of the mobile station apparatus 3 and a prescribed transmit power value estimated for transmission of an uplink signal. The maximum transmit power value of the mobile station apparatus 3 indicates a limit value of a power value which the mobile station apparatus 3 can transmit, which is determined by being specified from a performance of an amplifier in the mobile station apparatus 3, or from the higher layers (e.g. radio resource control section 107) of the base station apparatus 1. That is, the maximum transmit power value of the mobile station apparatus 3 may be determined by a system uniquely in advance, and may be simultaneously notified of to the mobile station apparatus 3 from the base station apparatus 1 as broadcast information, and may be notified of to each mobile station apparatus 3 from the base station apparatus 1.

Figure 2:
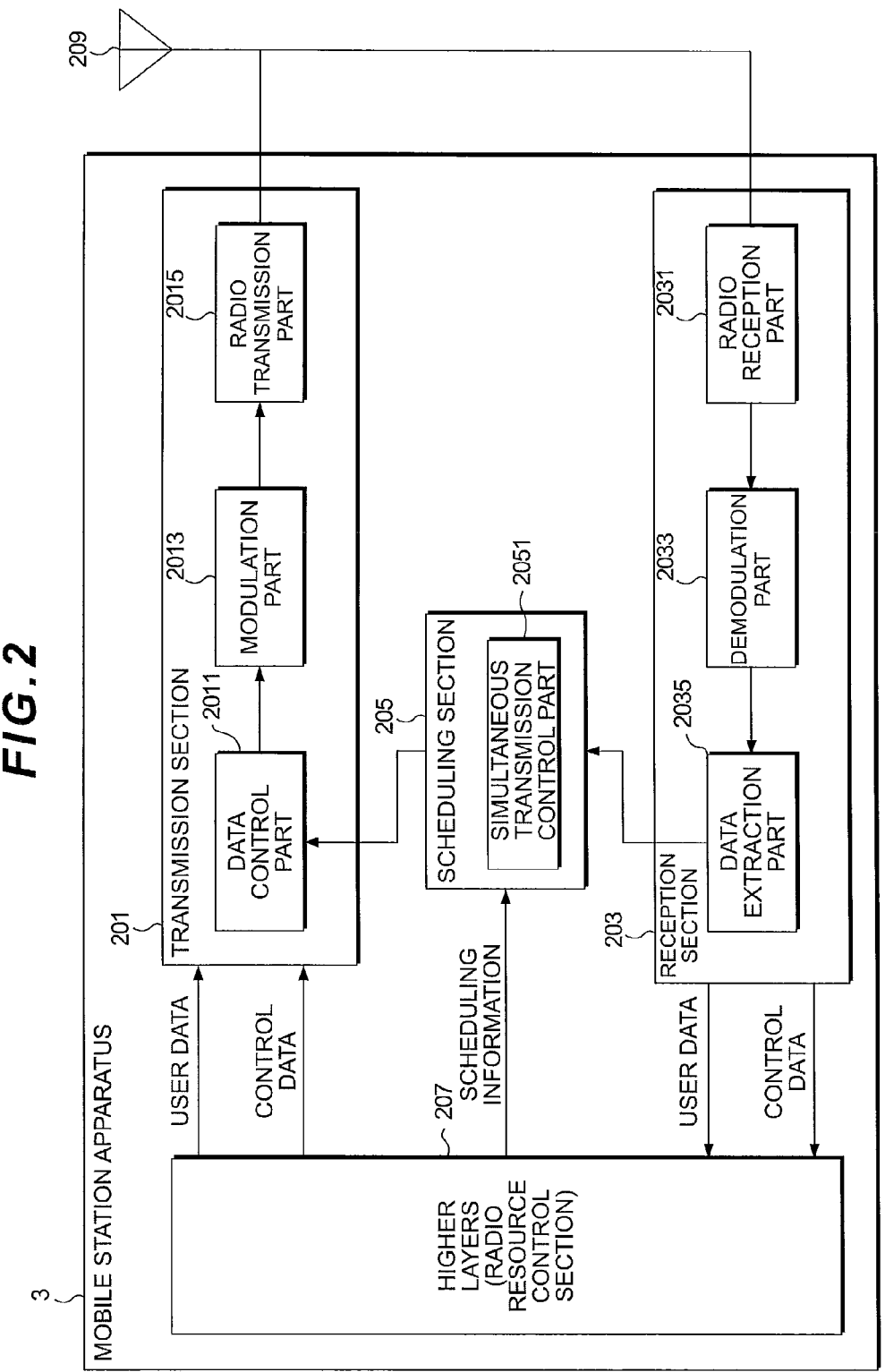
FIG. 2 is a block diagram showing a schematic functional configuration of a mobile station apparatus 3 of the present invention.

FIG. 2 is a block diagram showing a schematic functional configuration of the mobile station apparatus 3 of the present invention. The mobile station apparatus 3 includes a transmission section (mobile station side transmission section) 201, a reception section 203, a scheduling section 205, higher layers (e.g. radio resource control section 207), and an antenna 209. The transmission section 201 includes a data control part 2011, a modulation part 2013, and a radio transmission part 2015. The reception section 203 includes a radio reception part 2031, a demodulation part 2033, and a data extraction part 2035.

User data and control data are inputted into the data control part 2011 from the higher layers (e.g. radio resource control section 207). The data control part 2011 arranges the inputted data to a PUSCH or a PUCCH by an instruction from the scheduling section 205. In addition, an uplink reference signal is also allocated then. The modulation part 2013 performs data modulation, and performs signal processing, such as discrete Fourier transform (hereinafter referred to as DFT), subcarrier mapping, inverse FFT (hereinafter referred to as IFFT), CP (Cyclic Prefix) insertion, and filtering, and generates a transmission signal. Then, the modulation part 2013 outputs the modulated signal to the radio transmission part 2015. The radio transmission part 2015 carries out up-conversion of the modulated data to a radio frequency and thereafter, transmits it to the base station apparatus 1 via the antenna 209.

The radio reception part 2031 receives a downlink signal from the base station apparatus 1, carries out down-conversion to a baseband signal, and outputs the reception signal to the demodulation part 2033. The demodulation part 2033 demodulates the received data. The data extraction part 2035 separates the received data into user data and control data. The data extraction part 2035 outputs, to the scheduling section 205, control data with respect to scheduling information, a random access response message and intermittent reception control, and other control data of the second layer, and outputs user data to the higher layers (radio resource control section) 207.

The scheduling section 205 analyzes the control data inputted from the data extraction part 2035, and generates uplink scheduling information, and on the basis of the scheduling information, instructs the data control parts 2011 to allocate the user data and the control data to a PUSCH and a PUCCH. In addition, the scheduling section 205 has the simultaneous transmission control part 2051, and based on scheduling information from the higher layers (radio resource control section) 207, controls simultaneous transmission of a data signal and a reference signal for channel estimation.

The higher layers (radio resource control section) 207 performs processing of a medium access control (MAC) layer, a radio link control (RLC) layer, a packet data convergence protocol (PDCP) layer and a radio resource control (RRC) layer. Since the higher layers (radio resource control section) 207 integrates and controls a processing part of a lower layer, interfaces between the higher layers (radio resource control section) 207 and the scheduling section 205, the antenna 209, the transmission section 201 and the reception section 203 exists (not shown).

Figure 3:
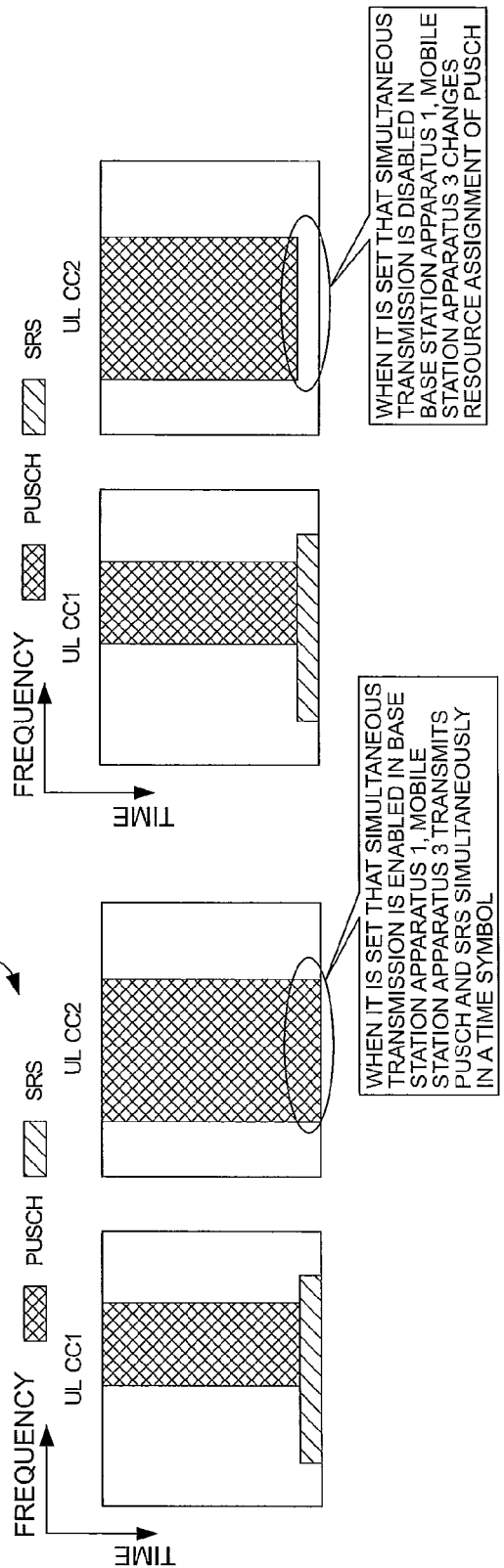
FIG. 3 is a figure showing a resource allocation of an uplink signal when simultaneous transmission of a reference signal for channel estimation and a data signal may be carried out, and when the simultaneous transmission must not be carried out in a first embodiment of the present invention.

In the first embodiment of the present invention, FIG. 3 is a figure showing a resource allocation of an uplink signal when simultaneous transmission of a reference signal for channel estimation and a data signal may be carried out, and when the simultaneous transmission must not be carried out. When it is set, in the simultaneous transmission setting part 1051 of the base station apparatus 1, that simultaneous transmission of a reference signal for channel estimation and a data signal may be carried out, the simultaneous transmission control part 2051 of the mobile station apparatus 3 determines that the reference signal for channel estimation and the data signal is transmitted simultaneously to the base station apparatus based on the simultaneous transmission control information. When it is set, in the simultaneous transmission setting part 1051 of the base station apparatus 1, that the simultaneous transmission of the reference signal for channel estimation and the data signal must not be carried out, the simultaneous transmission control part 2051 of the mobile station apparatus 3, based on the simultaneous transmission control information, determines to change a resource allocation of a data signal so that the data signal may not be assigned in the time symbol where the reference signal for channel estimation is allocated and to transmit it to the base station apparatus 1. That is, the mobile station apparatus 3 allocates only a reference signal for channel estimation to the 14th symbol, and transmits it.

Figure 4:
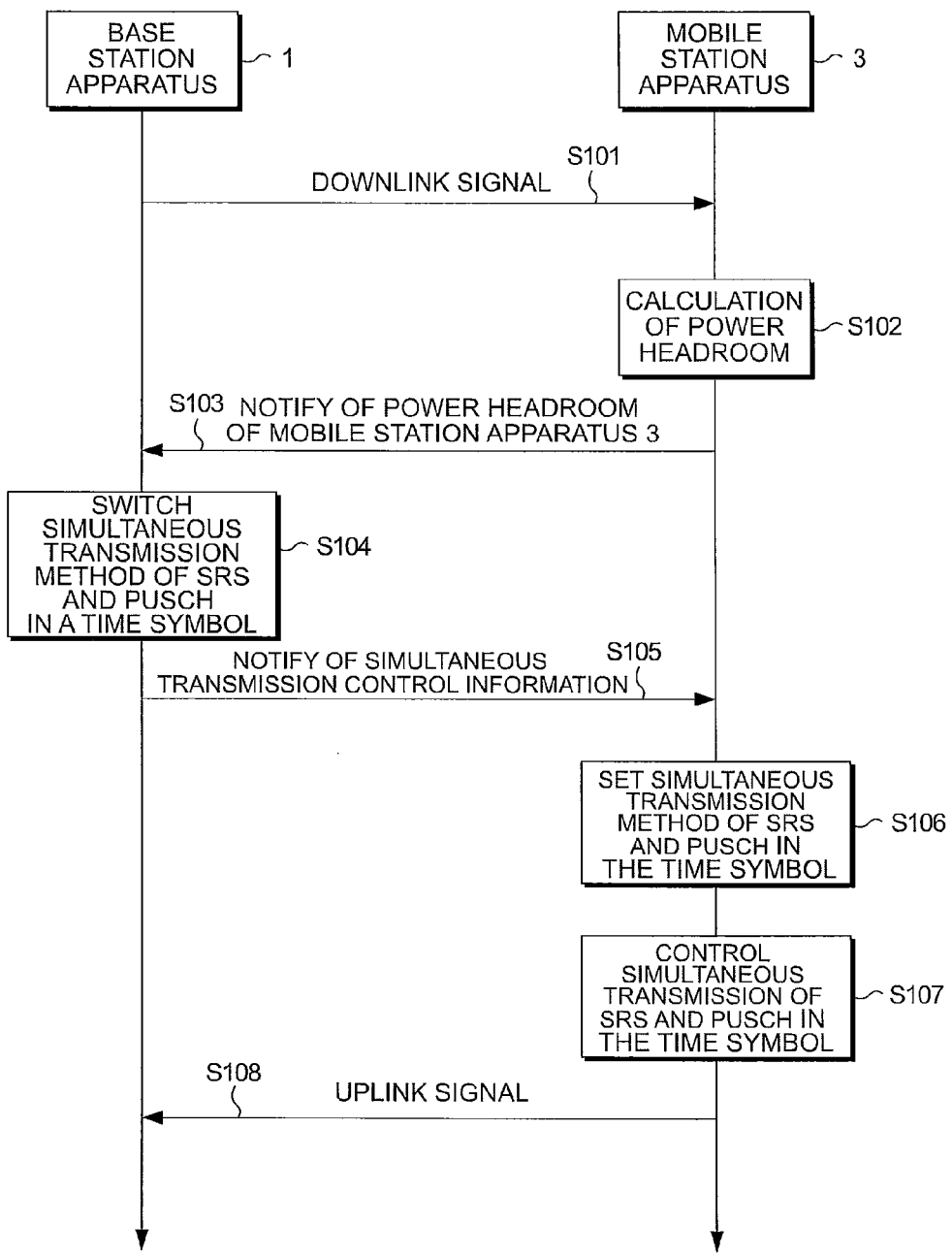
FIG. 4 is a sequence chart showing a setting procedure of simultaneous transmission control information of the base station apparatus 1 and the mobile station apparatus 3 according to the first embodiment of the present invention.

FIG. 4 is a sequence chart showing a setting procedure of simultaneous transmission control information of the base station apparatus 1 and the mobile station apparatus 3 according to the first embodiment of the present invention. The base station apparatus 1 transmits a downlink signal to the mobile station apparatus 3 (Step S101). The radio resource control section 207 of the mobile station apparatus 3 calculates a power headroom on the basis of information included in the downlink signal (Step S102). The mobile station apparatus 3 notifies the base station apparatus 1 of the calculated a power headroom (Step S103). The simultaneous transmission setting part 1051 of the base station apparatus 1 sets whether simultaneous transmission of a data signal and a reference signal for channel estimation may be performed on the basis of a power headroom which has been notified of (Step S104). The base station apparatus 1 notifies the mobile station apparatus 3 of the simultaneous transmission control information (Step S105).

The simultaneous transmission control part 2051 of the mobile station apparatus 3 sets the notified simultaneous transmission control information which has been notified of (Step S106), and when a data signal and a reference signal for channel estimation are assigned in the same time symbol, performs a resource allocation of an uplink signal based on the simultaneous transmission control information (Step S107). The mobile station apparatus 3 transmits an uplink signal to the base station apparatus 1 (Step S108).

The simultaneous transmission setting part 1051 of the base station apparatus 1 can judge whether to perform a broadband communication including single-carrier and multi-carrier on the basis of the power headroom which has been transmitted from the mobile station apparatus 3. The simultaneous transmission setting part 1051 of the base station apparatus 1, when judging that there is a margin in a power headroom of the mobile station apparatus 3, sets the simultaneous transmission control information in advance so that the simultaneous transmission of a PUSCH and a SRS may be carried out. The simultaneous transmission control part 2051 of the mobile station apparatus 3, while receiving the simultaneous transmission control information, determines to perform simultaneous transmission of the PUSCH and the SRS.

When the simultaneous transmission setting part 1051 of the base station apparatus 1 sets that simultaneous transmission must not be carried out, by performing control so as to change a resource allocation of the data signal so that the data signal may not be allocated in a time symbol where a reference signal for channel estimation is allocated, a channel quality of the reference signal for channel estimation can always be guaranteed. In an environment where a movement speed of the mobile station apparatus 3 is fast, and where a channel quality has changed immediately, control of a resource allocation of an uplink signal in accordance with the channel quality of the mobile station apparatus 3 can be performed by increasing a frequency of channel estimation.

<Second Embodiment>

Then, a second embodiment of the present invention will be described. Since a function configuration of an apparatus in the second embodiment is the same as that of what is shown in the first embodiment, the description is omitted here. In the second embodiment, the base station apparatus 1, when it is set that simultaneous transmission of a reference signal for channel estimation and a data signal must not be carried out, carries out control so that the reference signal for channel estimation may not be transmitted (dropped). In the second embodiment, the simultaneous transmission control part 2051, when the simultaneous transmission control information indicates that simultaneous transmission of a data signal and a reference signal for channel estimation is enabled, performs control where the data signal is allocated in a time symbol in which the reference signal for channel estimation is allocated, and on the other hand, when the simultaneous transmission control information indicates that a data signal and a reference signal for channel estimation is not enabled, performs control so as to change a resource allocation of a data signal so that the data signal may not be allocated in a time symbol where the reference signal for channel estimation is allocated.

Figure 5:
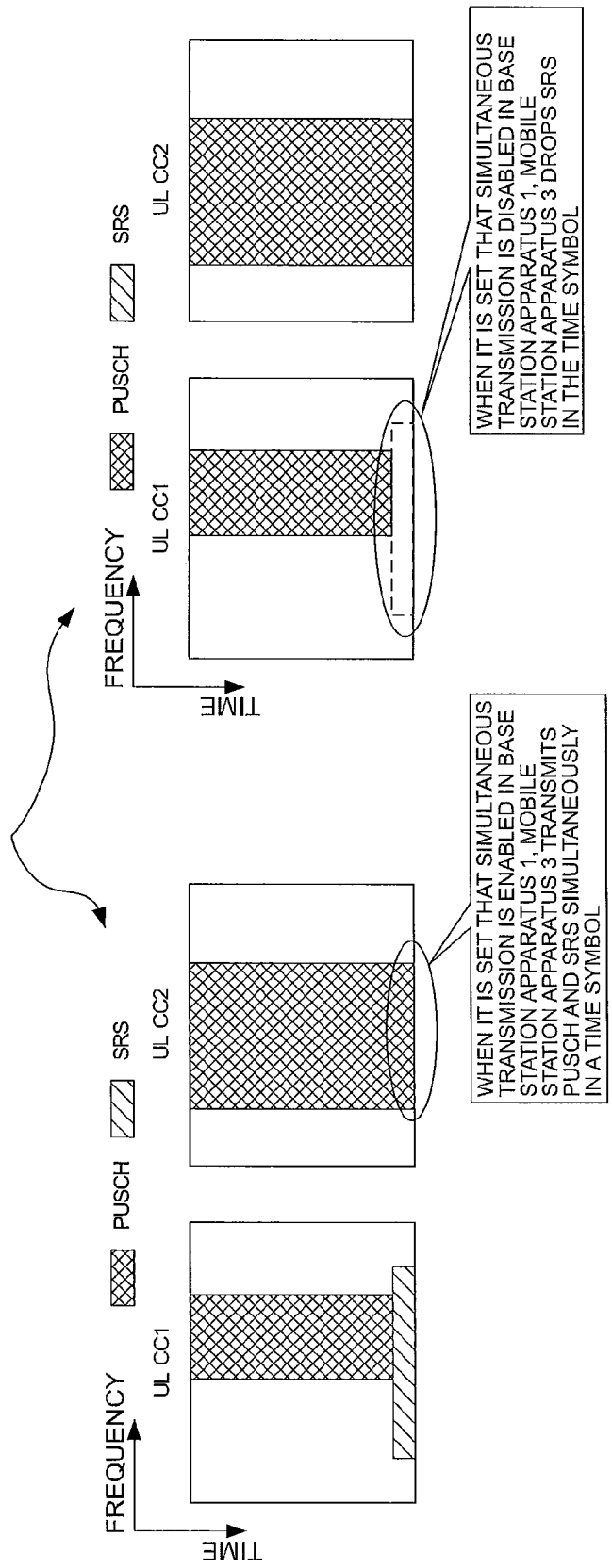
FIG. 5 is a figure showing a resource allocation of an uplink signal when simultaneous transmission of a reference signal for channel estimation and a data signal may be carried out and when the simultaneous transmission must not be carried out in a second embodiment of the present invention.

In the second embodiment of the present invention, FIG. 5 is a figure showing a resource allocation of an uplink signal when simultaneous transmission of a reference signal for channel estimation and a data signal may be carried out and when the simultaneous transmission must not be carried out. When it is set, in the simultaneous transmission setting part 1051 of the base station apparatus 1, that simultaneous transmission of a reference signal for channel estimation and a data signal may be carried out, the simultaneous transmission control part 2051 of the mobile station apparatus 3 determines that the reference signal for channel estimation and the data signal is transmitted simultaneously to the base station apparatus based on the simultaneous transmission control information. When the simultaneous transmission setting part 1051 of the base station apparatus 1 sets that simultaneous transmission of a reference signal for channel estimation and a data signal must not be carried out, the simultaneous transmission control part 2051 of the mobile station apparatus 3, based on the simultaneous transmission control information, performs control so that the reference signal for channel estimation may not be assigned in the same time frame as the data signal and may not be transmitted (is dropped), and determines that only the data signal is transmitted to the base station apparatus 1.

However, as exception processing, when single transmission is set in setting information of a reference signal for channel estimation, the mobile station apparatus 3, in order to place priority on channel estimation, can change a resource allocation of a data signal so that the data signal may not be assigned in the time symbol where the reference signal for channel estimation is allocated. When the base station apparatus 1 sets that simultaneous transmission must not be carried out, a communication quality such as transmission speed of a data signal can always be guaranteed by performing control so that a reference signal for channel estimation may not be transmitted (is dropped) in the time frame where a data signal is transmitted. This method is used when transmitting many data signals. For example, this is effective in the communication when the mobile station apparatus 3 does not move at all, that is, in an environment where channel quality is not changed.

<Third Embodiment>

Then, a third embodiment of the present invention will be described. Since a function configuration of an apparatus in the third embodiment is the same as that of what is shown in the first embodiment, the description is omitted here. In the third embodiment, the simultaneous transmission control part 2051, when the simultaneous transmission control information indicates that simultaneous transmission of a data signal and a reference signal for channel estimation is enabled, performs control where the data signal is allocated in a time symbol in which the reference signal for channel estimation is allocated, and on the other hand, when the simultaneous transmission control information indicates that simultaneous transmission of a data signal and a reference signal for channel estimation is not enabled, performs control where the reference signal for channel estimation is not transmitted in a time frame where the data signal is transmitted.

In addition, in the third embodiment, the simultaneous transmission control part 2051, when the simultaneous transmission control information indicates that simultaneous transmission of a data signal and a reference signal for channel estimation is enabled, performs control where the data signal and the reference signal for channel estimation are allocated in the same time frame, and on the other hand, when the simultaneous transmission control information indicates that a data signal and a reference signal for channel estimation is not enabled, in accordance with a type of information of the data signal, performs, in a switching manner, either of control where the reference signal for channel estimation may not be transmitted in the time frame where the data signal is transmitted or control where the resource allocation of the data signal is changed so that the data signal may not be allocated in the time symbol where the reference signal for channel estimation is allocated.

Figure 6:
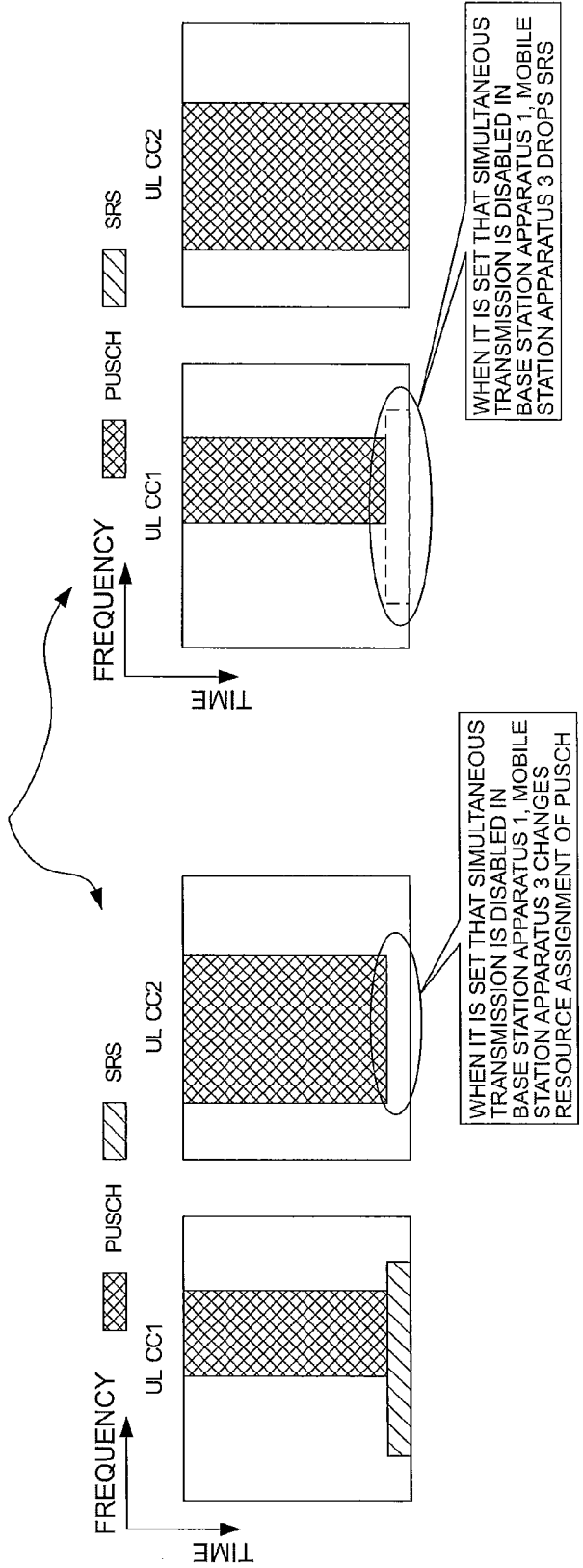
FIG. 6 is a figure showing a resource allocation of an uplink signal when it is set that simultaneous transmission must not be carried out in a third embodiment of the present invention.

FIG. 6 is a figure showing a resource allocation of an uplink signal when it is set that simultaneous transmission must not be carried out in the third embodiment of the present invention. When it is set that simultaneous transmission of a reference signal for channel estimation and a data signal are not carried out in the simultaneous transmission setting part 1051 of the base station apparatus 1, and the reference signal for channel estimation and the data signal are assigned in the same time symbol in the mobile station apparatus 3, the simultaneous transmission control part 2051 of the mobile station apparatus 3 can switch whether to change the resource allocation of the data signal so that the data signal may not be assigned in the time symbol where the reference signal for channel estimation is allocated, or whether to make the reference signal for channel estimation not to be transmitted in the same time frame as the data signal based on the simultaneous transmission control information set by the simultaneous transmission setting part 1051 of the base station apparatus 1.

In the third embodiment, the simultaneous transmission control part 2051 of the mobile station apparatus 3 where it is set that simultaneous transmission of a reference signal for channel estimation and a data signal must not be carried out, in accordance with a type of information of the data signal, can switch whether to change the resource allocation of the data signal so that the data signal may not be assigned in the time symbol where the reference signal for channel estimation is allocated, or whether to make the reference signal for channel estimation not to be transmitted in the same time frame as the data signal.

For example, when a message 3 is assigned to a data signal, the simultaneous transmission control part 2051 of the mobile station apparatus 3 can perform control so that the reference signal for channel estimation may not be transmitted (dropped) in the same time frame as the data signal. In a transmission phase of the message 3, since the base station apparatus 1 has not recognized from which mobile station apparatus 3 it has been transmitted, there is a possibility that it can not be demodulated in the base station apparatus 1 even if the resource allocation is changed and it is transmitted. In order to avoid such situation, it is necessary to carry out preferentially transmission of the data signal where the message 3 has been assigned.

In the third embodiment, when the simultaneous transmission control part 1051 of the base station apparatus 1 sets that simultaneous transmission of a reference signal for channel estimation and a data signal must not be carried out, the simultaneous transmission control part 2051 of the mobile station apparatus 3, in accordance with a type of information of the data signal, can switch whether to change the resource allocation of the data signal so that the data signal may not be assigned in the time symbol where the reference signal for channel estimation is allocated, or whether to make the reference signal for channel estimation not to be transmitted in the same time frame as the data signal.

<Fourth Embodiment>

Then, a fourth embodiment of the present invention will be described. Since a function configuration of an apparatus in the fourth embodiment is the same as that of what is shown in the first embodiment, the description is omitted here. Although it is set, in the base station apparatus, that simultaneous transmission of a data signal and a reference signal for channel estimation may be carried out, much transmit power not less than anticipated by the base station apparatus 1 can be assigned to the data signal and the reference signal for channel estimation due to a change in a path loss or the like when carrying out simultaneous transmission actually in the mobile station apparatus 3, and as the result, it is anticipated that the sum total transmit power of the data signal and the reference signal may become not less than the maximum transmit power of the mobile station apparatus 3. In the fourth embodiment and a fifth embodiment described later, in consideration of the case where such a state occurs, when the sum total transmit power of a data signal and a reference signal for channel estimation becomes not less than the maximum transmit power of the mobile station apparatus 3, the base station apparatus 1 can configure in advance whether to reduce the transmit power of either signal.

In the fourth embodiment, the simultaneous transmission setting part 1051 sets simultaneous transmission control information indicating that simultaneous transmission of a data signal and a reference signal for channel estimation is enabled, and when the data signal and the reference signal for channel estimation are assigned in the same time symbol, for the mobile station apparatus 3 where the sum total transmit power of the data signal and the reference signal for channel estimation becomes not less than the maximum transmit power, notifies the mobile station apparatus 3, via the transmission section, of the information indicating that control where only the transmit power of the data signal is reduced is performed, while including it in the simultaneous transmission control information. The simultaneous transmission control part 2051, when the simultaneous transmission control information indicates that the simultaneous transmission of the data signal and the reference signal for channel estimation is enabled, if the sum total transmit power of the data signal and the reference signal for channel estimation is less than the maximum transmit power, performs control where the data signal and the reference signal for channel estimation in the same time symbol, and on the other hand, if the sum total transmit power of the data signal and the reference signal for channel estimation is not less than the maximum transmit power, performs control so that the sum total transmit power of the data signal and the reference signal for channel estimation becomes less than the maximum transmit power by reducing the transmit power of the data signal, and performs the simultaneous transmission of the data signal and the reference signal for channel measurement.

In the fourth embodiment, the mobile station apparatus 3 where it is set, by the base station apparatus 1, that the simultaneous transmission may be carried out, when the sum total transmit power of the data signal and the reference signal for channel estimation becomes not less than the maximum transmit power of the mobile station apparatus 3 due to a change in a path loss or the like, can transmit simultaneously the data signal and the reference signal for channel estimation since the sum total transmit power of the data signal and the reference signal for channel estimation may become less than the maximum transmit power by reducing only the transmit power of the data signal.

In the fourth embodiment, when the simultaneous transmission setting part 1051 of the base station apparatus 1 sets that simultaneous transmission of a data signal and a reference signal for channel estimation may be carried out, when the sum total transmit power of the data signal and the reference signal for channel estimation becomes not less than the maximum transmit power of the mobile station apparatus 3, the simultaneous transmission setting part 1051 includes, in the simultaneous transmission control information, that control is performed so that the sum total transmit power of the data signal and the reference signal for channel estimation becomes less than the maximum transmit power of the mobile station apparatus 3 by reducing the transmit power of the data signal. The simultaneous transmission control part 2051 of the mobile station apparatus 3, when the sum total transmit power of the data signal and the reference signal for channel estimation becomes not less than the maximum transmit power on the basis of the simultaneous transmission control information, determines that the data signal and the reference signal for channel estimation is transmitted simultaneously to the base station apparatus 1 after reducing only the transmit power of the data signal so that the sum total transmit power of the data signal and the reference signal for channel estimation may become less than the maximum transmit power.

Figure 7:
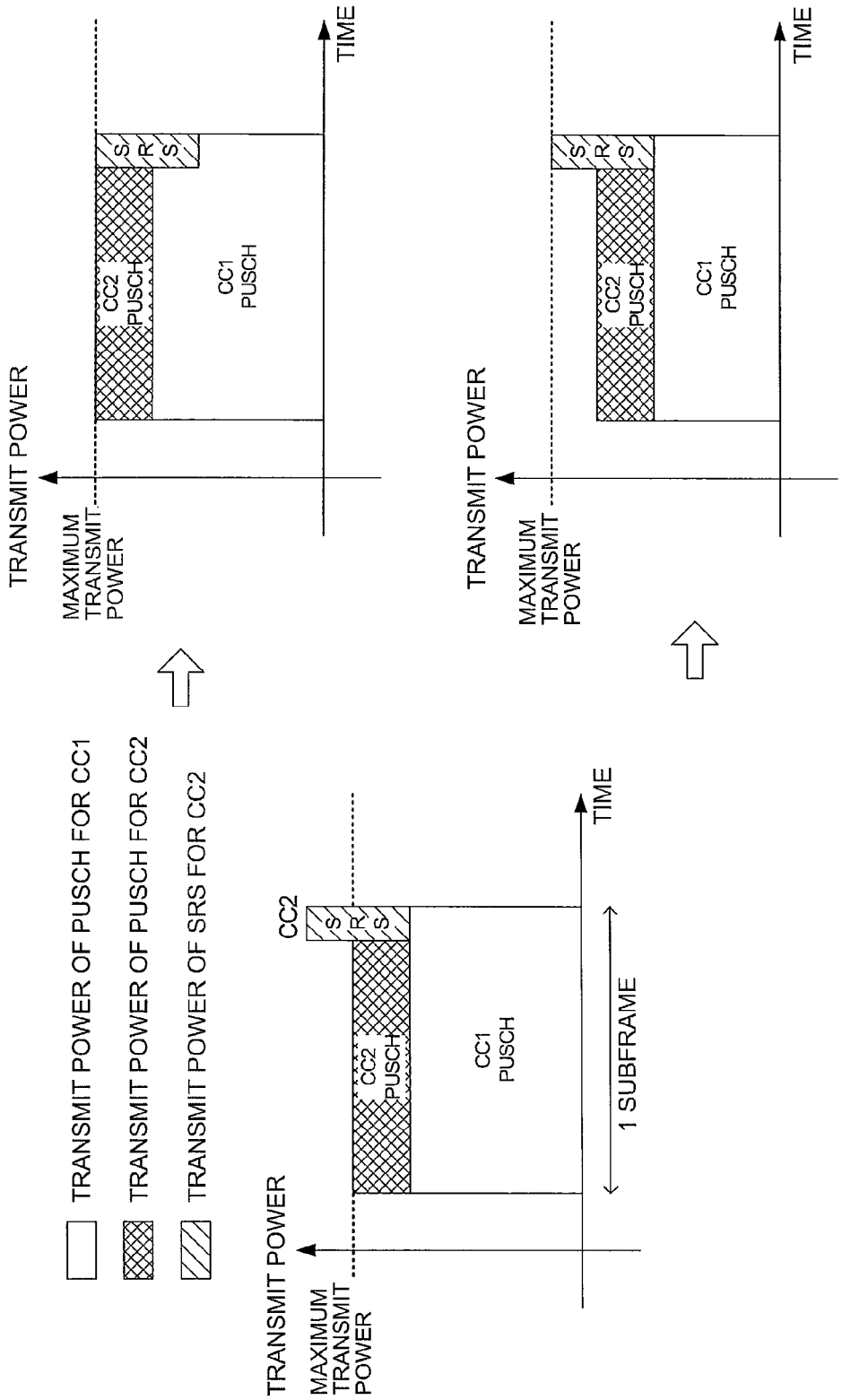
FIG. 7 is a schematic diagram of transmit power distribution of a time symbol of an uplink signal of the mobile station apparatus 3 according to a fourth embodiment of the present invention.

FIG. 7 is a schematic diagram of transmit power distribution of a time symbol of an uplink signal of the mobile station apparatus 3 according to the fourth embodiment of the present invention. The vertical axis indicates a transmit power of the mobile station apparatus 3, and the horizontal axis indicates time. As shown in a left-hand side part of FIG. 7, when simultaneous transmission of a data signal (PUSCH for CC1) and a reference signal for channel estimation (SRS for CC2) is carried out, there is a case which exceeds the maximum transmit power (dotted line). Therefore, as for the mobile station apparatus 3, based on the simultaneous transmission control information transmitted from the base station apparatus 1, there are a case where the transmit power of the data signal of the time symbol where the reference signal for channel estimation is allocated is reduced (upper-right part of FIG. 7) and a case where the transmit power of all the symbols for a CC1 is reduced (lower-right part of FIG. 7), and whether to use either of them is determined depending on a communication state and a magnitude of a transmit power to be reduced.

By reducing the transmit power of the data signal, a communication quality of the data signal may deteriorate, and however, by placing priority on the reference signal for channel estimation, the base station apparatus 1 can judge whether there is any band where a communicating state is better than a band which the mobile station apparatus 3 uses currently. In addition, if the scheduling section 105 of the base station apparatus 1 can perform scheduling so that a data signal of the mobile station apparatus 3 can be assigned to a band where a communicating state is good as the result of the channel estimation, an improvement of the communication quality of the data signal of the mobile station apparatus 3 can be performed.

<Fifth Embodiment>

Then, a fifth embodiment of the present invention will be described. Since a function configuration of an apparatus in the fifth embodiment is the same as that of what is shown in the first embodiment, the description is omitted here. In the fifth embodiment, the mobile station apparatus 3 where it is set, by the base station apparatus 1, that the simultaneous transmission may be carried out, when the sum total transmit power of the data signal and the reference signal for channel estimation becomes not less than the maximum transmit power in the mobile station apparatus 3 side due to a change in a path loss or the like, reduces only the transmit power of the data signal so that the sum total transmit power of the data signal and the reference signal for channel estimation may become less than the maximum transmit power and transmits it, and thereby, the simultaneous transmission of the reference signal for channel estimation and the data signal is enabled.

In the fifth embodiment, the simultaneous transmission setting part 1051 sets simultaneous transmission control information indicating that simultaneous transmission of a data signal and a reference signal for channel estimation is enabled, and when the data signal and the reference signal for channel estimation are assigned in the same time symbol, for the mobile station apparatus 3 where the sum total transmit power of the data signal and the reference signal for channel estimation becomes not less than the maximum transmit power, includes, in the simultaneous transmission control information, the information indicating that control where only the transmit power of the reference signal for channel estimation is reduced is performed, and notifies the mobile station apparatus 3 of it via the transmission section. The simultaneous transmission control part 2051, when the simultaneous transmission control information indicates that simultaneous transmission of a data signal and a reference signal for channel estimation is enabled, if the sum total transmit power of the data signal and the reference signal for channel estimation is less than the maximum transmit power, performs control where the data signal and the reference signal for channel estimation are transmitted in the same time symbol, and on the other hand, if the sum total transmit power of the data signal and the reference signal for channel estimation is not less than the maximum transmit power, performs control so that the sum total transmit power of the data signal and the reference signal for channel estimation becomes less than the maximum transmit power by reducing the transmit power of the reference signal for channel estimation, and performs the simultaneous transmission of the data signal and the reference signal for channel estimation.

In the fifth embodiment, when the simultaneous transmission setting part 1051 of the base station apparatus 1 sets that the simultaneous transmission of a data signal and a reference signal for channel estimation may be carried out, when the sum total transmit power of the data signal and the reference signal for channel estimation becomes not less than the maximum transmit power of the mobile station apparatus 3, the simultaneous transmission setting part 1051 includes, in the simultaneous transmission control information, that control is performed so that the sum total transmit power of the data signal and the reference signal for channel estimation becomes less than the maximum transmit power of the mobile station apparatus 3 by reducing the transmit power of the reference signal for channel estimation. The simultaneous transmission control part 2051 of the mobile station apparatus 3, when the sum total transmit power of a data signal and a reference signal for channel estimation in a time symbol becomes not less than the maximum transmit power on the basis of the simultaneous transmission control information, determines that the data signal and the reference signal for channel estimation are transmitted simultaneously to the base station apparatus 1 after reducing only the transmit power of the reference signal for channel estimation so that the sum total transmit power of the data signal and the reference signal for channel estimation may become less than the maximum transmit power.

FIG. 8 is a schematic diagram of transmit power distribution of a time symbol of an uplink signal of the mobile station apparatus 3 according to the fifth embodiment of the present invention. The vertical axis indicates a transmit power of the mobile station apparatus 3, and the horizontal axis indicates time. As shown in a left-hand side part of FIG. 8, when simultaneous transmission of a data signal (PUSCH for CC1) and a reference signal for channel estimation (SRS for CC2) is carried out, there is a case which exceeds the maximum transmit power (dotted line). Therefore, the mobile station apparatus 3, reducing the transmit power of the reference signal for channel estimation assigned in the same time frame as the data signal based on the simultaneous transmission control information transmitted from the base station apparatus 1, can perform the simultaneous transmission of the data signal and the reference signal for channel estimation. In addition, by maintaining the transmit power of the data signal, a communication quality, such as transmission speed of the data signal, can be guaranteed.

Besides, in the fourth embodiment and the fifth embodiment, a configuration table which lists an transmit power reduction amount of a reference signal for channel estimation or a data signal (include also not transmitting either when there is not too much margin) in accordance with a power headroom of the mobile station apparatus 3 may be included in the simultaneous transmission control information transmitted to the mobile station apparatus 3 from the base station apparatus 1. In addition, the base station apparatus 1, when a data signal and a reference signal for channel estimation are allocated in the same time symbol, if the sum total transmit power of the data signal and the reference signal for channel estimation exceeds the maximum transmit power (or a power headroom) of the mobile station apparatus 3, can also be set so that the excess portion of the maximum transmit power of the mobile station apparatus 3 may be reduced equally (uniformly) to each transmit power of the data signal and the reference signal for channel estimation. That is, the mobile station apparatus 3 can scale down each of the transmit power of the data signal and the reference signal so that the sum total transmit power of the data signal and the reference signal becomes less than the maximum transmit power of the mobile station apparatus 3. For example, the base station apparatus 1, when it is judged that an excess amount over the a maximum transmit power value (or power headroom) is 6 dB, can also notify the mobile station apparatus 3 so that each power of the data signal and the reference signal for channel estimation may be reduced by 3 dB, while including it in the simultaneous transmission control information, and can also notify as a different information from the simultaneous transmission control information. That is, the transmit power reduction amount of the data signal and the reference signal for channel estimation may be notified of to the mobile station apparatus 3 together with the simultaneous transmission control information, and may be notified of simultaneously using broadcast information, and may be notified of to the mobile station apparatus 3 individually from the base station apparatus 1.

Besides, a computer may be made to realize a part of functions of the base station apparatus 1 and the mobile station apparatus 3 in the embodiment mentioned above. In that case, it may be realized by that a program for realizing this control function is recorded on a computer-readable recording medium, and a program recorded on this recording medium is made to be read into a computer system, and is executed.

Besides, the "computer system" mentioned here shall include an OS and hardware such as a peripheral device. The "computer-readable recording medium" refers to a flexible disk, a magnetic-optical disk, a ROM, a portable medium such as a CD-ROM, and a storage device such as a hard disk built-in in a computer system. In addition, the "computer-readable recording medium" may also include one which holds a program in a short time and dynamically like a communication line when transmitting a program via a network such as Internet and a communication line such as a telephone line, and one which holds a program in certain period of time like a volatile memory inside a computer system which will be a server and client in that case. The above-mentioned program may be one for realizing a part of function mentioned above, and in addition, may be one which can realize an above-mentioned function in combination with a program already recorded in a computer system.

In addition, a part or all of the mobile station apparatus 3 and the base station apparatus 1 in above-mentioned embodiments may be made to be realized as a LSI which is an integrated circuit typically. Each functional block of the mobile station apparatus 3 and the base station apparatus 1 may be made in a chip individually, and a part or all may be integrated in a chip. A circuit-integrating method may be realized as a dedicated circuit or a general-purpose processor without being limited to a LSI. When a circuit-integrating technology in place of a LSI comes into existence owing to a progress of a semiconductor technology, it is also enabled to use an integrated circuit according to this technology.

Hereinabove, an embodiment of this invention has been described in detail with reference to drawings, and a specific configuration is not limited to one mentioned above, a design etc. without departing from substance of this invention are included in the scope of claims.

INDUSTRIAL APPLICABILITY

DESCRIPTION OF SYMBOLS

1 Base station apparatus
3 Mobile station apparatus
101 Transmission section
103 Reception section
105 Scheduling section
107 Higher layers (radio resource control section)
201 Transmission section (mobile station side transmission section)
203 Reception section
205 Scheduling section
207 Higher layers (radio resource control section)
1051 Simultaneous transmission setting part
2051 Simultaneous transmission control part

The invention claimed is:

1. A mobile station apparatus configured to communicate with a base station apparatus by using at least two component carriers, the mobile station apparatus comprising:
   a reception circuit;
   a transmission circuit; and
   a control circuit, wherein
      the reception circuit is configured to receive, from the base station apparatus, a radio resource control (RRC) signal including first information,
      the first information includes a parameter, timing information, and second information, wherein
         the parameter is associated with a transmit power of the mobile station apparatus,
         the timing information is associated with transmission timings including a first timing for transmission of a sounding reference signal (SRS) and is used for aligning uplink transmission timings, and
         the second information includes one or more parameters associated with a second timing for transmission of the SRS, which is different from the first timing, the second information being used for configuring transmissions of the SRS,
      the reception circuit is further configured to receive, from the base station apparatus, scheduling information for an uplink by using a physical downlink control channel (PDCCH),
      the transmission circuit is configured to transmit, to the base station apparatus, an uplink data (UL-SCH) by using a physical uplink shared channel (PUSCH) based on the scheduling information for the uplink,
      the transmission circuit is further configured to transmit, to the base station apparatus, the SRS based on both the first timing and the second timing, and
      the control circuit is configured not to transmit the SRS in a case that the transmission of the SRS and the transmission of the PUSCH occur at different component carriers at the same timing, a sum of transmit powers of the transmission of the SRS and the transmission of the PUSCH exceeds a maximum transmit power of the mobile station apparatus, and the transmission of the PUSCH corresponds to a random access procedure.

2. The mobile station apparatus according to claim 1, wherein
   the reception circuit is configured to receive, from the base station apparatus, a random access response in a case that a random access is performed by the base station apparatus and the mobile station apparatus,
   the transmission circuit is configured to transmit a message by using the PUSCH in a case that the random access response is received, and
   the transmission circuit is configured not to perform the transmission of the SRS in a case that the transmission of the SRS and the transmission of the message using the PUSCH occur at the same timing.

3. A control method of a mobile station apparatus configured to communicate with a base station apparatus by using at least two component carriers, the control method comprising:
   receiving, from the base station apparatus, a radio resource control (RRC) signal including first information, the first information including a parameter, timing information, and second information, wherein
      the parameter is associated with a transmit power of the mobile station apparatus,
      the timing information is associated with transmission timings including a first timing for transmission of a sounding reference signal (SRS) and is used for aligning uplink transmission timings, and
      the second information includes one or more parameters associated with a second timing for transmission of the SRS, which is different from the first timing, and the second information being used for configuring transmissions of the SRS;
   receiving, from the base station apparatus, scheduling information for an uplink by using a physical downlink control channel (PDCCH);
   transmitting, to the base station apparatus, an uplink data (UL-SCH) by using a physical uplink shared channel (PUSCH) based on the scheduling information for the uplink; and
   transmitting, to the base station apparatus, the SRS based on both the first timing and the second timing, wherein
      in a case that both the first information and the second information are included in the RRC signal, wherein
      the SRS is not transmitted in a case that the transmission of the SRS and the transmission of the PUSCH occur at different component carriers at the same timing, a sum of transmit powers of the transmission of the SRS and the transmission of the PUSCH exceeds a maximum transmit power of the mobile station apparatus, and the transmission of the PUSCH corresponds to a random access procedure.

4. The control method according to claim 3, further comprising:
   receiving, from the base station apparatus, a random access response in a case that a random access is performed by the base station apparatus and the mobile station apparatus; and
   transmitting a message by using the PUSCH in a case that the random access response is received, wherein
   the transmission of the SRS is not performed in a case that the transmission of the SRS and the transmission of the message using the PUSCH occur at the same timing.

5. An integrated circuit to be installed in a mobile station apparatus configured to communicate with a base station apparatus by using at least two component carriers, the integrated circuit comprising:
- a reception circuit configured to receive, from the base station apparatus, a radio resource control (RRC) signal including first information, the first information including a parameter, timing information, and second information, wherein
  - the parameter is associated with a power of the mobile station apparatus,
  - the timing information is associated with transmission timings including a first timing for transmission of a sounding reference signal (SRS) and is used for aligning uplink transmission timings, and
  - the second information includes one or more parameters associated with a second timing for transmission of the SRS, which is different from the first timing, and the second information is used for configuring transmissions of the SRS;
- the reception circuit further configured to receive, from the base station apparatus, scheduling information for an uplink by using a physical downlink control channel (PDCCH);
- a transmission circuit configured to:
  - transmit, to the base station apparatus, an uplink data (UL-SCH) by using a physical uplink shared channel (PUSCH) based on the scheduling information for the uplink; and
  - transmit, to the base station apparatus, the SRS based on both the first timing and the second timing, wherein
    - the SRS is not transmitted in a case that the transmission of the SRS and the transmission of the PUSCH occur at different component carriers at the same timing, a sum of transmit powers of the transmission of the SRS and the transmission of the PUSCH exceeds a maximum transmit power of the mobile station apparatus, and the transmission of the PUSCH corresponds to a random access procedure.

6. The integrated circuit according to claim 5, wherein:
the reception circuit is configured to receive, from the base station apparatus, a random access response in a case that a random access is performed by the base station apparatus and the mobile station apparatus,
the transmission circuit is configured to transmit a message by using the PUSCH in a case that the random access response is received, and
the transmission circuit is configured not to perform the transmission of the SRS in a case that the transmission of the SRS and the transmission of the message using the PUSCH occur at the same timing.

7. A non-transitory computer readable recording medium storing a control program of a mobile station apparatus configured to communicate with a base station apparatus by using at least two component carriers, the control program making the mobile station apparatus perform at least:
receiving, from the base station apparatus, a radio resource control (RRC) signal including first information, the first information including a parameter, timing information, and second information, wherein
  the parameter is associated with a power of the mobile station apparatus,
  the timing information is associated with transmission timings including a first timing for transmission of a sounding reference signal (SRS) and is being used for aligning uplink transmission timings, and
  the second information includes one or more parameters associated with a second timing for transmission of the SRS, which is different from the first timing, and the second information being used for configuring transmissions of the SRS;
receiving, from the base station apparatus, scheduling information for an uplink by using a physical downlink control channel (PDCCH);
transmitting, to the base station apparatus, an uplink data (UL-SCH) by using a physical uplink shared channel (PUSCH) based on the scheduling information for the uplink; and
transmitting, to the base station apparatus, the SRS based on both the first timing and the second timing, wherein
  the SRS is not transmitted in a case that the transmission of the SRS and the transmission of the PUSCH occur at different component carriers at the same timing, a sum of transmit powers of the transmission of the SRS and the transmission of the PUSCH exceeds a maximum transmit power of the mobile station apparatus, and the transmission of the PUSCH corresponds to a random access procedure.

8. The non-transitory computer readable recording medium according to claim 7, further making the mobile station apparatus perform:
receiving, from the base station apparatus, a random access response in a case that a random access is performed by the base station apparatus and the mobile station apparatus; and
transmitting a message by using the PUSCH in a case that the random access response is received, wherein
the transmission of the SRS is not performed in a case that the transmission of the SRS and the transmission of the message using the PUSCH occur at the same timing.

* * * * *